United States Patent
Mizutani

(10) Patent No.: US 7,275,510 B2
(45) Date of Patent: Oct. 2, 2007

(54) STARTUP-TIME CONTROL APPARATUS AND STOP-TIME CONTROL APPARATUS OF INTERNAL COMBUSTION ENGINE, AND CONTROL METHODS THEREOF, AND RECORD MEDIUM

(75) Inventor: Koichi Mizutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/633,406

(22) Filed: Dec. 5, 2006

(65) Prior Publication Data

US 2007/0074701 A1   Apr. 5, 2007

Related U.S. Application Data

(62) Division of application No. 11/122,102, filed on May 5, 2005, now Pat. No. 7,159,572, which is a division of application No. 10/226,151, filed on Aug. 23, 2002, now Pat. No. 6,986,331.

(30) Foreign Application Priority Data

Sep. 11, 2001   (JP)   ............................. 2001-274697

(51) Int. Cl.
F02N 17/06   (2006.01)
F01P 5/14    (2006.01)

(52) U.S. Cl. ............................. 123/179.4; 123/198 D; 123/41.15

(58) Field of Classification Search ............. 123/179.3, 123/179.4, 145.5 E, 145.5 R, 198 D; 237/12.3 R, 237/12.5 B; 180/65.1–65.8

See application file for complete search history.

(56) References Cited

U.S. PATENT DOCUMENTS

| | | | |
|---|---|---|---|
| 4,156,407 A * | 5/1979 | Moll et al. ............... | 123/41.49 |
| 4,223,361 A | 9/1980 | Zaitsu et al. | |
| 4,224,913 A | 9/1980 | Barnard | |
| 4,434,749 A * | 3/1984 | Morita et al. ............ | 123/41.02 |
| 4,489,242 A * | 12/1984 | Worst ........................ | 307/10.1 |
| 4,532,894 A * | 8/1985 | Wulf et al. ........... | 123/142.5 E |
| 4,594,986 A | 6/1986 | Shimoda et al. | |
| 4,630,577 A | 12/1986 | Cornacchia | |
| 4,770,148 A | 9/1988 | Hibino et al. | |
| 4,773,378 A | 9/1988 | Fujimura et al. | |
| 4,777,924 A | 10/1988 | Fujimura et al. | |
| 4,867,115 A | 9/1989 | Henein | |
| 4,875,443 A | 10/1989 | Sano et al. | |
| 4,951,633 A | 8/1990 | Achleitner et al. | |
| 5,079,488 A * | 1/1992 | Harms et al. ............... | 318/471 |
| 5,251,588 A * | 10/1993 | Tsujii et al. .......... | 123/142.5 R |

(Continued)

FOREIGN PATENT DOCUMENTS

JP   U 57-51137   3/1982

(Continued)

*Primary Examiner*—Stephen K. Cronin
*Assistant Examiner*—Arnold Castro
(74) *Attorney, Agent, or Firm*—Oliff & Berridge, PLC

(57) ABSTRACT

If it is determined that the present engine startup is a high-temperature startup, immediately fuel injection in concert with start of cranking is prohibited. After a delay time elapses following the start of cranking, or when THC<THCh is satisfied, fuel injection is started. Therefore, the cranking during the delay time cools interior of the combustion chambers. Since fuel injection starts after the cooling, preignition can be prevented.

5 Claims, 15 Drawing Sheets

U.S. PATENT DOCUMENTS

| | | |
|---|---|---|
| 5,577,482 A | 11/1996 | Nakashima et al. |
| 5,809,973 A | 9/1998 | Iida et al. |
| 5,910,096 A | 6/1999 | Hepburn et al. |
| 6,178,928 B1 * | 1/2001 | Corriveau ................. 123/41.12 |
| 6,374,798 B1 | 4/2002 | Nagai et al. |
| 6,464,027 B1 * | 10/2002 | Dage et al. ................. 180/65.2 |
| 6,607,142 B1 * | 8/2003 | Boggs et al. ........... 237/12.3 B |
| 6,708,661 B1 | 3/2004 | Aubourg et al. |
| 6,732,941 B2 * | 5/2004 | Homan et al. ......... 237/12.3 B |
| 6,889,125 B2 * | 5/2005 | Nakao et al. ................. 701/22 |
| 6,986,331 B2 | 1/2006 | Mizutani |
| 7,082,905 B2 * | 8/2006 | Fukuda et al. ........... 123/41.31 |
| 7,159,572 B2 | 1/2007 | Mizutani |

FOREIGN PATENT DOCUMENTS

| | | |
|---|---|---|
| JP | A-2-119647 | 5/1990 |
| JP | A-9-184459 | 7/1997 |
| JP | A-11-22520 | 1/1999 |
| JP | A-2000-220496 | 8/2000 |
| JP | A-2000-328979 | 11/2000 |

* cited by examiner

STARTUP-TIME CONTROL APPARATUS AND STOP-TIME CONTROL APPARATUS OF INTERNAL COMBUSTION ENGINE, AND CONTROL METHODS THEREOF, AND RECORD MEDIUM

INCORPORATION BY REFERENCE

This is a Division of application Ser. No. 11/122,102 filed May 5, 2005, now U.S. Pat. No. 7,159,572 which in turn is a Division of application Ser. No. 10/226,151 filed Aug. 23, 2002, now U.S. Pat. No. 6,986,331 issued Jan. 17, 2006. The entire disclosures of the prior applications are hereby incorporated by reference herein in their entirety. The disclosure of Japanese Patent Application No. 2001-274697 filed on Sep. 11, including the specification, drawings and abstract, is incorporated herein by reference in its entirety.

BACKGROUND OF THE INVENTION

1. Field of the Invention

The invention relates to a startup-time control apparatus and a stop-time control apparatus in an internal combustion engine in which fuel is injected into a combustion chamber, and also relates to control methods of the apparatuses, and a record medium storing the control methods.

2. Description of the Related Art

A known related-art technology is an automatic stop-start apparatus that automatically stops an internal combustion engine when the vehicle is in a stopped state, for example, for a traffic signal or the like, and that automatically starts up the engine for a start of the vehicle upon an operation for a vehicle run, for the purpose of improving fuel economy and reducing emissions. In a known system, the above-described automatic stop-start apparatus is combined with a direct-injection type gasoline engine, that is, an internal combustion engine in which fuel is injected into a combustion chamber (Japanese Patent Application Laid-Open No. 2000-328979).

When an internal combustion engine stops operating, the water pump driven by the engine also stops. Therefore, after a stop of operation of the engine, the temperature inside the combustion chambers does not immediately fall, but temporarily remains high because the cooling by the water pump is not performed. In a construction where an automatic stop-start apparatus as described above is adopted, the automatic stop duration from an automatic stop to an automatic start tends to be considerably shorter than a manual stop duration. Therefore, in many cases, the temperature in the combustion chambers is high at the time of an automatic start.

If a direct-injection type internal combustion engine is started while the combustion chamber temperature is high, fuel is injected from fuel injection valves into high-temperature combustion chambers simultaneously with the cranking. Therefore, there is a danger of pre-ignition.

The problem of pre-ignition is not limited to the case of an automatic startup performed by an automatic stop-start apparatus, but may also occur at the time of a manual engine startup operation performed by a driver if the duration from the stop to the startup of the engine is short so that the combustion chamber temperature remains high.

SUMMARY OF THE INVENTION

It is an object of the invention to prevent pre-ignition at the time of a startup of a type of internal combustion engine in which fuel is injected into a combustion chamber.

In order to achieve the foregoing object, one aspect of the invention provides a startup-time control apparatus of an internal combustion engine in which fuel is injected into a combustion chamber, the control apparatus including: a high-temperature startup determining portion that determines whether the internal combustion engine is in a high-temperature state at a time of startup of the internal combustion engine; and a fuel injection start timing setting portion that sets an injection timing of an injection valve such that fuel injection starts after a delay period elapses following a start of cranking if the internal combustion engine is in the high-temperature state.

Another aspect of the invention provides a startup-time control apparatus of an internal combustion engine in which fuel is injected into a combustion chamber, and in which an automatic stop-automatic startup control of automatically stopping and restarting a combustion operation upon satisfaction of an automatic stop condition and an automatic start condition, respectively, is performed, the control apparatus including: an automatic startup determining portion that determines whether the combustion operation has been automatically restarted; and a fuel injection start timing setting portion that sets an injection timing of an injection valve such that fuel injection starts after a delay period elapses following a start of cranking if the combustion operation is automatically restarted.

Still another aspect provides a startup-time control apparatus of an internal combustion engine in which fuel is injected into a combustion chamber, the internal combustion engine including: a high-temperature startup determining portion that determines whether the internal combustion engine is in a high-temperature state at a time of startup of the internal combustion engine; and a startup-time fuel injection amount setting portion that sets a smaller amount of fuel injection at a time of startup if the high-temperature startup determining portion determines that the internal combustion engine is in the high-temperature state at the time of startup than if the internal combustion engine is not in the high-temperature state at the time of startup.

A further aspect of the invention provides a startup-time control apparatus of an internal combustion engine in which fuel is injected into a combustion chamber, and in which an automatic stop-automatic startup control of automatically stopping and restarting a combustion operation upon satisfaction of an automatic stop condition and an automatic start condition, respectively, is performed, the control apparatus including: an automatic startup determining portion that determines whether the combustion operation has been automatically restarted; and a startup-time fuel injection amount setting portion that sets a less amount of fuel injection when the combustion operation is automatically restarted than at the time of startup caused by a startup operation performed by an operator.

A still further aspect provides a startup-time control apparatus in which fuel injection into a combustion chamber and fuel injection into an intake passage are possible, the control apparatus including: a high-temperature startup determining portion that determines whether the internal combustion engine is in a high-temperature state at a time of startup of the internal combustion engine; and a startup-time fuel injection selecting portion which accomplishes the fuel injection at the time of startup by performing the fuel injection into the combustion chamber or the fuel injection into both the combustion chamber and the intake passage if the internal combustion engine is not in the high-temperature state at the time of startup, and which accomplishes the fuel injection at the time of startup by performing the fuel injection into the intake passage if the internal combustion engine is in the high-temperature state at the time of startup.

A yet further aspect provides a startup-time control apparatus of an internal combustion engine in which fuel injection into a combustion chamber and fuel injection into an intake passage are possible, and in which an automatic stop-automatic startup control of automatically stopping a combustion operation if an automatic stop condition is met, and of automatically restarting the combustion operation if an automatic start condition is met, is performed, the control apparatus including: an automatic startup determining portion that determines whether the combustion operation has been automatically restarted; and a startup-time fuel injection selecting portion which accomplishes the fuel injection at the time of startup by performing the fuel injection into the combustion chamber or the fuel injection into both the combustion chamber and the intake passage if the startup is other than a case where the combustion operation is automatically restarted, and which accomplishes the fuel injection at the time of startup by performing the fuel injection into the intake passage if the combustion operation is automatically restarted.

A further aspect of the invention provides a stop-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed, the control apparatus including: a high-temperature stop determining portion that determines whether the internal combustion engine is in a high-temperature state when the automatic stop condition is met; and an automatic stop execution control portion which executes automatic stop of the combustion operation if it is determined that the internal combustion engine is not in the high-temperature state when the automatic stop condition is met, and which prohibits the automatic stop of the combustion operation if it is determined that the internal combustion engine is in the high-temperature state when the automatic stop condition is met.

A further aspect of the invention provides a stop-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed, the control apparatus including: an automatic stop determining portion that determines whether the combustion operation has been automatically stopped; and a pre-startup cooling portion that drives a cooling device of the internal combustion engine during an automatically caused stop of the combustion operation.

A further aspect provides a startup-time control apparatus of an internal combustion engine in which fuel is injected into a combustion chamber, including: a high-temperature startup determining portion that determines whether the internal combustion engine is in a high-temperature state at a time of startup; and a pre-fuel injection setting portion that sets an injection timing of an injection valve such that fuel is injected into the combustion chamber prior to cranking if the high-temperature startup determining portion determines that the internal combustion engine is in the high-temperature state at the time of startup.

A further aspect provides a startup-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed, the control apparatus including: an automatic startup determining portion that determines whether the combustion operation has been automatically restarted; and a pre-fuel injection setting portion that sets an injection timing of an injection valve such that fuel is injected into the combustion chamber prior to cranking at the time of automatic startup.

A further aspect provides a stop-time control apparatus of an internal combustion engine in which fuel is injected into a combustion chamber, including: a high-temperature determining portion that determines whether the internal combustion engine is in a high-temperature state; and a during-stop fuel injection setting portion that sets an injection timing of an injection valve such that fuel is injected into the combustion chamber if the high-temperature determining portion determines that the internal combustion engine is in the high-temperature state during a stop of rotation of the internal combustion engine.

A further aspect provides a stop-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed, the control apparatus including a stop-time fuel injection setting portion that sets an injection timing of an injection valve such that fuel is injected into the combustion chamber immediately after an automatically caused stop of rotation of the internal combustion engine.

Furthermore, in order to achieve the foregoing object, there are provided methods in which process based on the above-described constructions are performed, and record media storing the methods.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Embodiment 1

Figure 1:
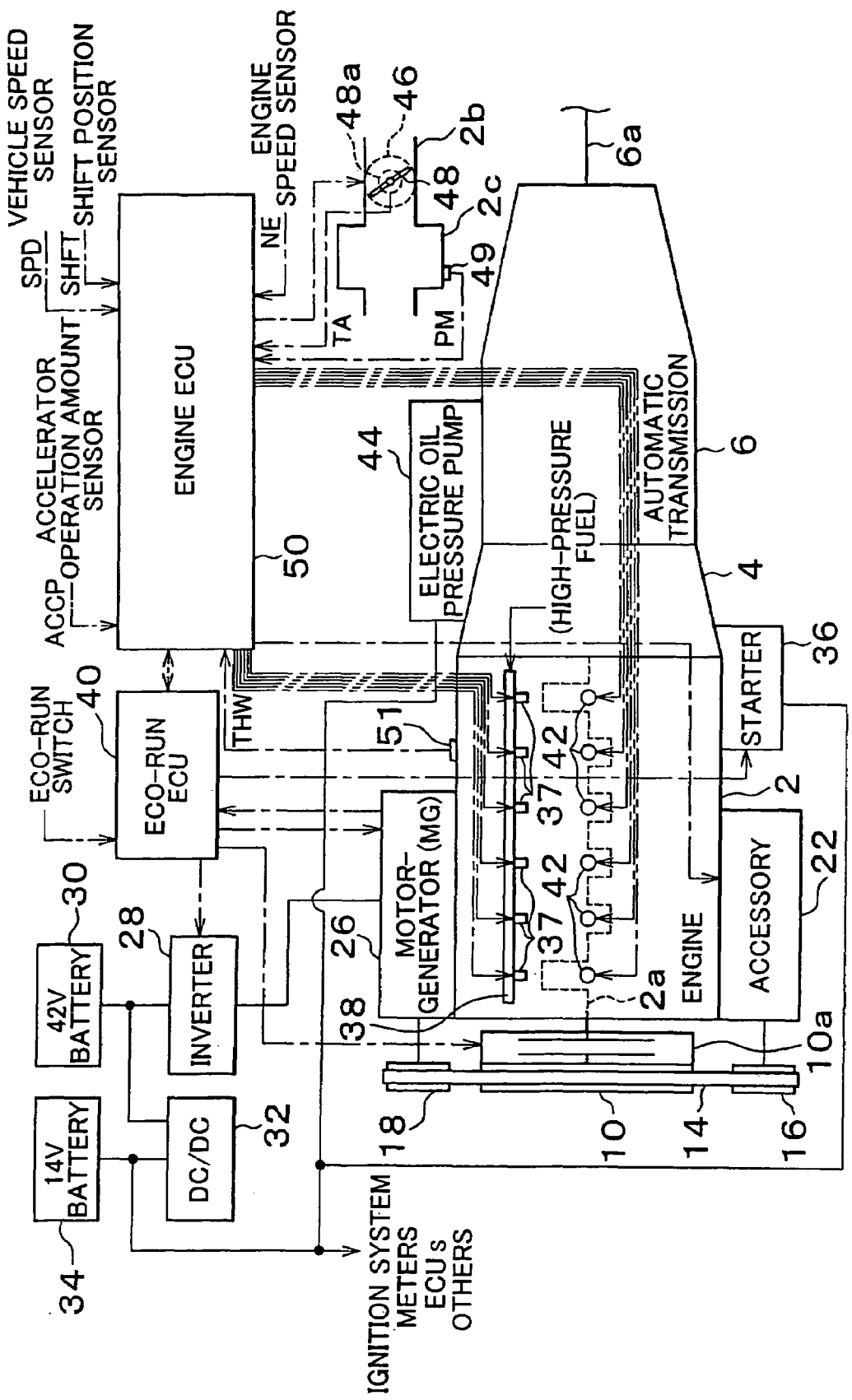
FIG. 1 is a diagram illustrating a system construction of a vehicular internal combustion engine and a control apparatus thereof in accordance with Embodiment 1.

FIG. 1 is a diagram illustrating a system construction of a vehicular internal combustion engine and a control apparatus thereof to which the invention is applied. In this embodiment, the internal combustion engine is a direct injection-type gasoline engine (hereinafter, referred to as "engine") 2.

Output of the engine 2 is transferred to the side of an output shaft 6a via a crankshaft 2a, a torque converter 4, an automatic transmission (hereinafter, referred to as "AT") 6, and is finally transferred to wheels. Separately from this power transfer train from the engine 2 to the wheel, output of the engine 2 (torque) is also transferred to a belt 14 via a pulley 10 connected to the crankshaft 2a. The torque transferred to the belt 14 rotates other pulleys 16, 18. The pulley 10 is provided with an electromagnetic clutch 10a. The electromagnetic clutch 10a is switched on (engaged) or switched off (disengaged) in accordance with need, thus allowing selection of transfer or non-transfer of output between the pulley 10 and the crankshaft 2a.

Of the pulleys 16, 18, the pulley 16 is connected with a rotation shaft of an accessory 22, whereby the accessory 22 can be driven by torque transferred from the belt 14. The accessory 22 may be, for example, an airconditioner compressor, a power steering pump, an engine-cooling water pump, etc. Although only one accessory 22 is shown in FIG. 1, there are various accessories in a real construction, for example, an airconditioner compressor, a power steering pump, an engine-cooling water pump, etc, and each accessory is provided with a dedicated pulley that is disposed so as to turn in cooperation with the belt 14. Although not shown, the airconditioner compressor is provided with a clutch that is switched on (engaged) or switched off (disengaged) in accordance with need, and thus allows selection of transfer or non-transfer of output between the pulley 16 and the airconditioner compressor.

The pulley 18 drivingly connects the belt 14 to a motor-generator (hereinafter, referred to as "MG") 26. The MG 26 functions as an electric generator ("generative mode" or "regenerative mode") when needed, so as to convert torque transferred from the engine 2 via the pulley 18 into electric energy. The MG 26 also functions as an electric motor ("drive mode") when needed, so as to turn the belt 14 via the pulley 18 and therefore drive one or both of the engine 2 and the accessory 22.

The MG 26 is electrically connected to an inverter 28. When the MG 26 is in the generative mode or the regenerative mode, the inverter 28 is switched so as to charge electric energy from the MG 26 into a high-voltage power supply (42 V in this embodiment) battery 30, and into a low-voltage power supply (14 V in this embodiment) battery 34 via a DC/DC converter 32, and so as to form a power supply for an ignition system, meters and the like, various ECUs (electronic control units), etc.

When the MG 26 is in the "drive mode", the inverter 28 supplies electric power from the high-voltage power supply battery 30 to the MG 26 to drive the MG 26. Thus, the accessory 22 is driven during a stop of the engine, and the crankshaft 2a can be rotated at the time of automatic startup or automatic stop of the engine, or at the time of drive-away of the vehicle. The inverter 28 is able to adjust the rotation speed of the MG 26 by adjusting the supply of electric energy from the high-voltage power supply battery 30 to the MG 26.

A starter 36 is provided for starting the engine at the time of a cold startup. The starter 36, supplied with power from the low-voltage power supply battery 34, is able to start the engine 2 by turning a ring gear.

A cylinder head of the engine 2 is provided with fuel injection valves 37 that inject fuel directly into combustion chambers. The fuel injection valves 37 are supplied with fuel via a delivery pipe 38 that receives high-pressure fuel from a high-pressure fuel pump (not shown). If the fuel injection valves 37 are controlled so that an amount of fuel corresponding to a stoichiometric air-fuel ratio is supplied from the delivery pipe 38 directly into each combustion chamber during the intake stroke, fuel is uniformly dispersed in the entire space of each combustion chamber, and is then ignited by an ignition plug 42. Thus, uniform combustion at the stoichiometric air-fuel ratio is accomplished. If the fuel injection valves 37 are controlled so that an amount of fuel that is less than the amount corresponding to the stoichiometric air-fuel ratio is supplied from the delivery pipe 38 into each combustion chamber during a late stage of the compression stroke, fuel is ignited by the ignition plug 42 while being in a stratified state, without being uniformly dispersed in the entire combustion chamber space. Thus, stratified charge combustion is accomplished. The uniform combustion mode and the stratified charge combustion mode are selected in accordance with the state of operation of the engine 2. It is also possible to omit the stratified charge combustion but perform only the uniform combustion despite the provision of the fuel injection valves 37 for injecting fuel directly into the combustion chambers.

The AT 6 is provided with an electric oil pressure pump 44 that is supplied with electric power from the low-voltage power supply battery 34. The electric oil pressure pump 44 supplies hydraulic fluid to a hydraulic control portion provided in the AT 6. The hydraulic fluid, controlled by control valves provided in the hydraulic control portion, adjusts the state of operation of clutches, brakes, and one-way clutches provided in the AT 6, so as to change the state of speed shift in accordance with need.

The aforementioned switching between the on and off states of the electromagnetic clutch 10a, the rotation speed control of the MG 26, the mode control of the inverter 28, the control of the starter 36, the state-of-charge control of the batteries 30, 34, etc., which are related to the automatic stop or the automatic start, are performed by an eco-run ECU 40. The eco-run ECU 40 sets the generative mode while the engine 2 is driven. When the engine 2 is decelerating, the eco-run ECU 40 sets the regenerative mode, and selects the on-state of the electromagnetic clutch 10a so that the MG 26 is turned by torque from the engine 2. Furthermore, at the time of starting up the engine 2, the eco-run ECU 40 sets the drive mode, and selects the on-state of the electromagnetic clutch 10a so that the engine 2 is turned by drive power from the MG 26. While the engine 2 is in the automatic stopped state, the eco-run ECU 40 maintains the drive mode, and selects the off-state of the electromagnetic clutch 10a so that some accessories 22, such as the airconditioner compressor, the power steering pump, etc., can be driven by the MG 26 when needed.

The switching on and off of accessories 22 excluding the water pump, the combustion mode switch control, the fuel injection control using the fuel injection valves 37, the control of the opening of a throttle valve 48 provided in an intake pipe 2b that is performed by using an electric motor 46, and other engine controls are executed by an engine ECU 50. The drive control of the electric oil pressure pump 44 and the speed shift control of the AT 6 are performed by a speed shift controlling ECU (not shown).

The eco-run ECU 40 detects the rotation speed of the rotation shaft of the MG 26 from a rotation speed sensor provided in the MG 26, and detects the presence or absence of an eco-run system start command made by a driver from an eco-run switch, and also detects other data. The engine ECU 50 detects various data for the engine control and the like, such as the engine cooling water temperature THW from a water temperature sensor 51 provided in a cylinder block or a cylinder head, the amount of accelerator operation ACCP from an accelerator operation amount sensor, the vehicle speed SPD from a vehicle speed sensor, the degree of throttle opening TA from a throttle opening sensor 48a, the shift position SHFT from a shift position sensor, the engine rotation speed NE from an engine rotation speed sensor, the intake pressure PM from an intake pressure sensor 49 provided in a surge tank 2c, the fuel pressure of the delivery pipe 38 from a fuel pressure sensor, etc.

Each of the ECUs 40, 50 has a microcomputer as a central component in which a CPU executes necessary processing in accordance with programs written in an internal ROM, and executes various controls based on results of processing. Results provided by processing and data detected as described above are exchanged between the ECUs 40, 50, which are capable of data communication therebetween. Therefore, the ECUs 40, 50 are able to execute controls in cooperation.

Figure 2:
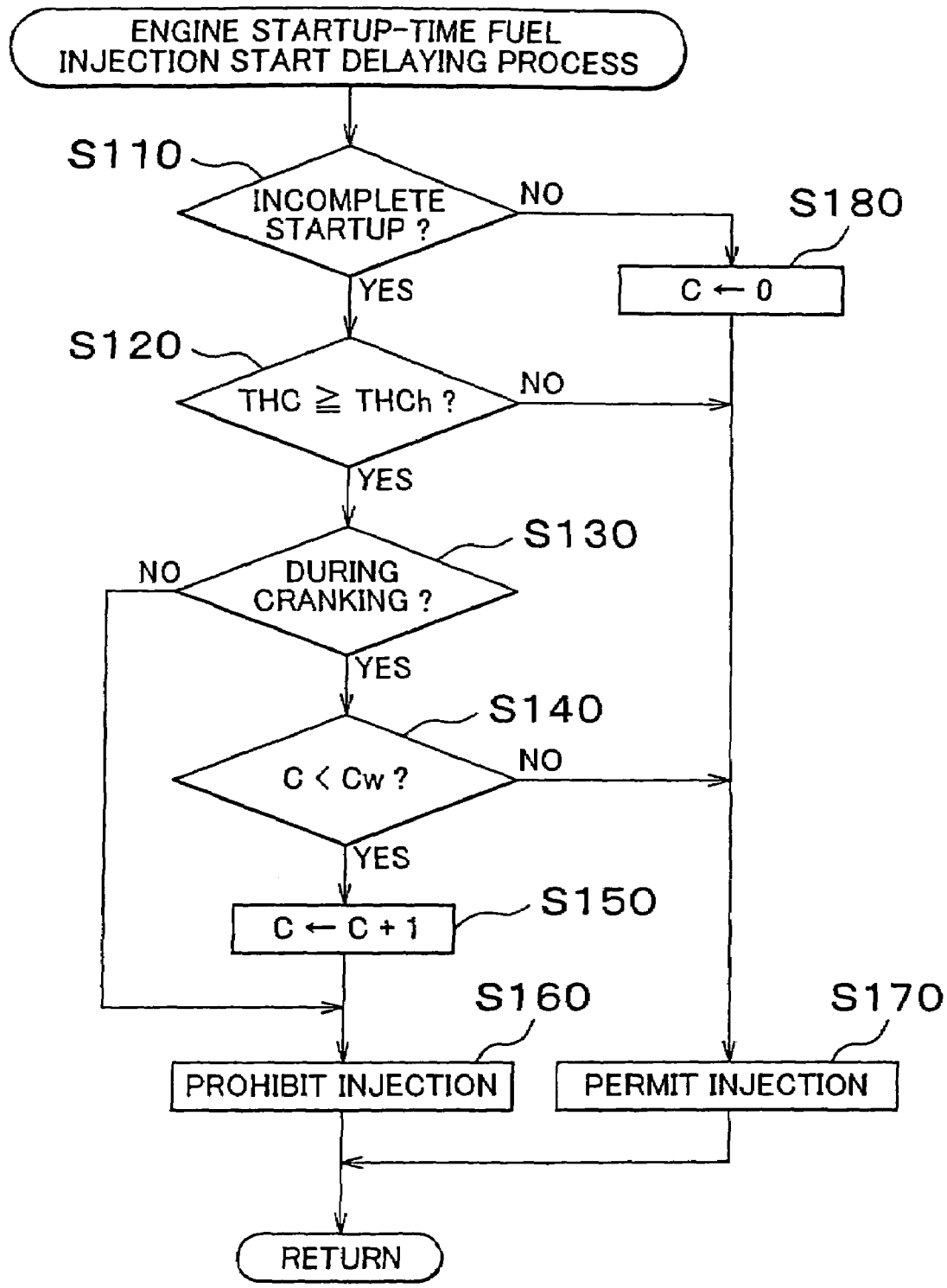
FIG. 2 is a flowchart illustrating an engine startup-time fuel injection start delaying process executed by an engine ECU in Embodiment 1.

FIG. 2 shows a flowchart illustrating an engine startup-time fuel injection start delaying process executed by the engine ECU 50. This process is executed at every 120° CA (crank angle) of the crankshaft 2a after a main switch is turned on by an ignition switch. Steps in the flowchart corresponding to separate processing contents are represented by "S".

When the process starts, it is first determined whether the engine startup (including an automatic start and a manual start caused by the ignition switch) is completed (S110). For example, it is determined that the startup is completed, if the engine rotation speed NE becomes 500 rpm or higher.

If the startup is not completed ("YES" at S110), it is then determined whether the combustion chamber temperature THC is higher than or equal to a high-temperature criterion THCh (S120). The combustion chamber temperature THC represents the temperature of an inner wall portion of a combustion chamber estimated from an operation history of the engine 2. Specifically, the engine ECU 50 estimates the combustion chamber temperature THC by executing a computation process of periodically integrating the heat balance of the amount of heat generated in association with combustion of fuel injected during operation of the engine, the amount of heat released due to external temperature and circulation of cooling water, the amount of heat absorbed by intake air, etc.

If THC<THCh ("NO" at S120), fuel injection from the fuel injection valves 37 into the combustion chambers is permitted (S170), and then the process temporarily ends.

Conversely, if THC≧THCh ("YES" at S120), which means a high-temperature state in the combustion chambers, it is then determined whether the cranking is being performed (S130). It is determined that the cranking is being performed, if in the case of automatic start, the control mode-indicating signal transmitted from the eco-run ECU 40 indicates an automatic start mode. It is determined that the cranking is being performed, if in the case of manual start, the ignition switch is at a starter position. If the cranking is not being performed ("NO" at S130), fuel injection from the fuel injection valves 37 into the combustion chambers is prohibited (S160). Then, the process temporarily ends.

Conversely, if the cranking is being performed ("YES" at S130), it is then determined whether a counter C is smaller than a reference delay value Cw corresponding to the delay time (S140). The reference delay value Cw is set as a value corresponding to a length of time that is needed for the cooling water present outside the engine immediately prior to the start of cranking to reach a surrounding of the combustion chambers and reduce the temperature in the combustion chambers.

The counter C is set at "0" at the time of startup of the engine ECU 50 or in 30 step S180 described below. Therefore, during an initial period, C<Cw holds ("YES" at S140), so that the counter C is incremented (S150), and the prohibition of fuel injection from the fuel injection valves 37 into the combustion chambers is continued (S160). Then, the process temporarily ends.

As long as the state where the determination of "YES" is made in steps S110, S120, S130 and S140 continues, the prohibition of fuel injection (S160) continues, so that fuel injection from the fuel injection valves 37 is not performed despite the cranking. Therefore, the water pump, that is, an accessory 22, is driven by the MG 26 or the starter 36 to circulate cooling water and thereby cool the engine 2. Furthermore, only external air supplied from the intake pipe 2b-side passes through the combustion chambers. Hence, the combustion chambers are efficiently cooled.

If C=Cw is reached ("NO" at S140) due to repeated increments in step S150, fuel injection is permitted (S170). As fuel injection from the fuel injection valves 37 thus starts, combustion starts in the combustion chambers. Then, the engine 2 enters a complete combustion state, and the engine rotation speed NE rises, so that the engine startup is completed ("NO" at S110). Then, the counter C is set at "0" (S180). After that, the fuel injection-permitted state continues (S170).

If THC<THCh is reached ("NO" at S120) before C=Cw, fuel injection from the fuel injection valves 37 into the combustion chambers is permitted (S170), so that combustion starts in the combustion chambers. Upon completion of the startup ("NO" at S110), the counter C is set at "0" (S180). After that, the fuel injection-permitted state continues (S170).

Figure 3:
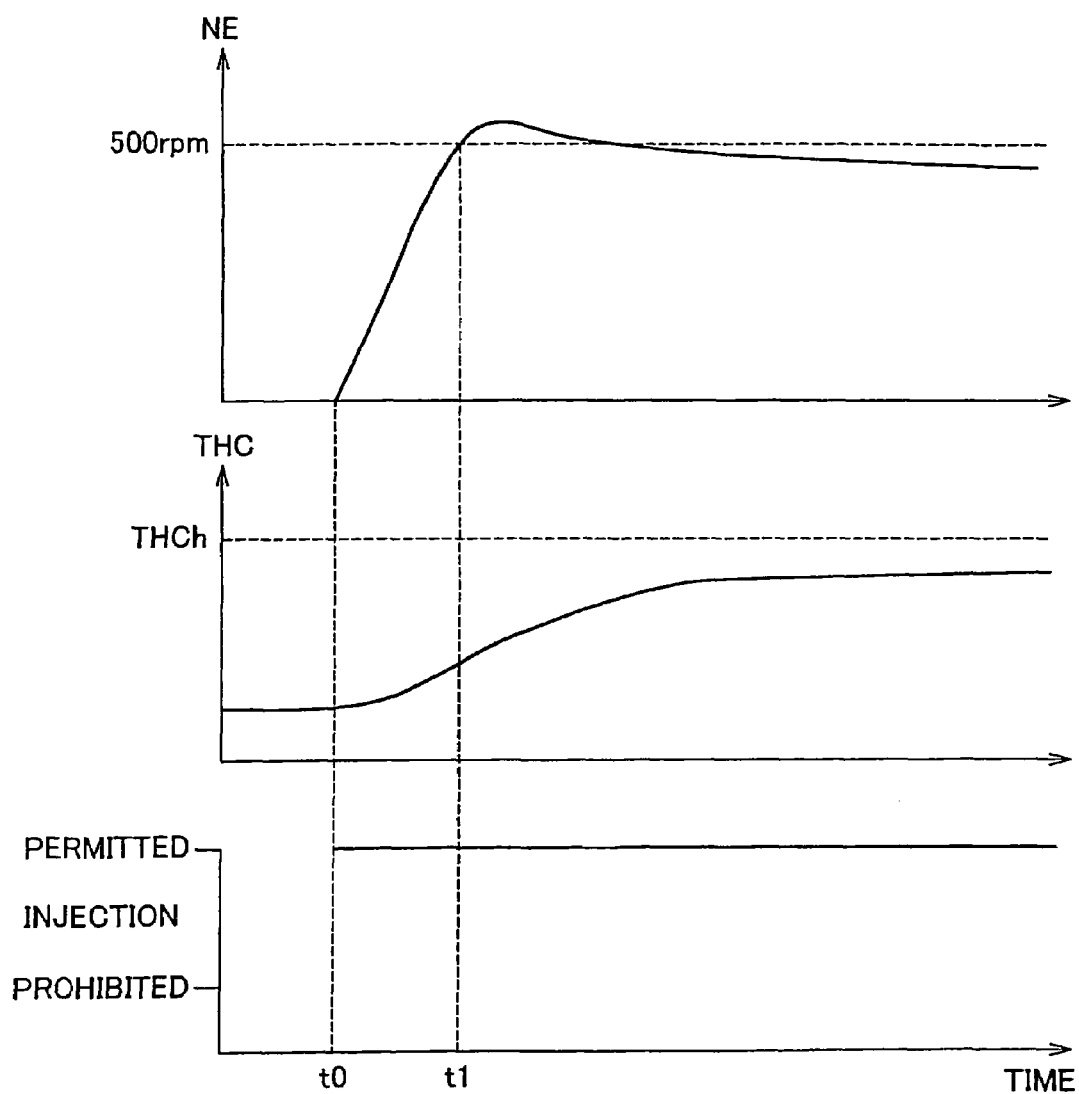
FIG. 3 is a timing chart indicating an example of processing in Embodiment 1.
Figure 4:
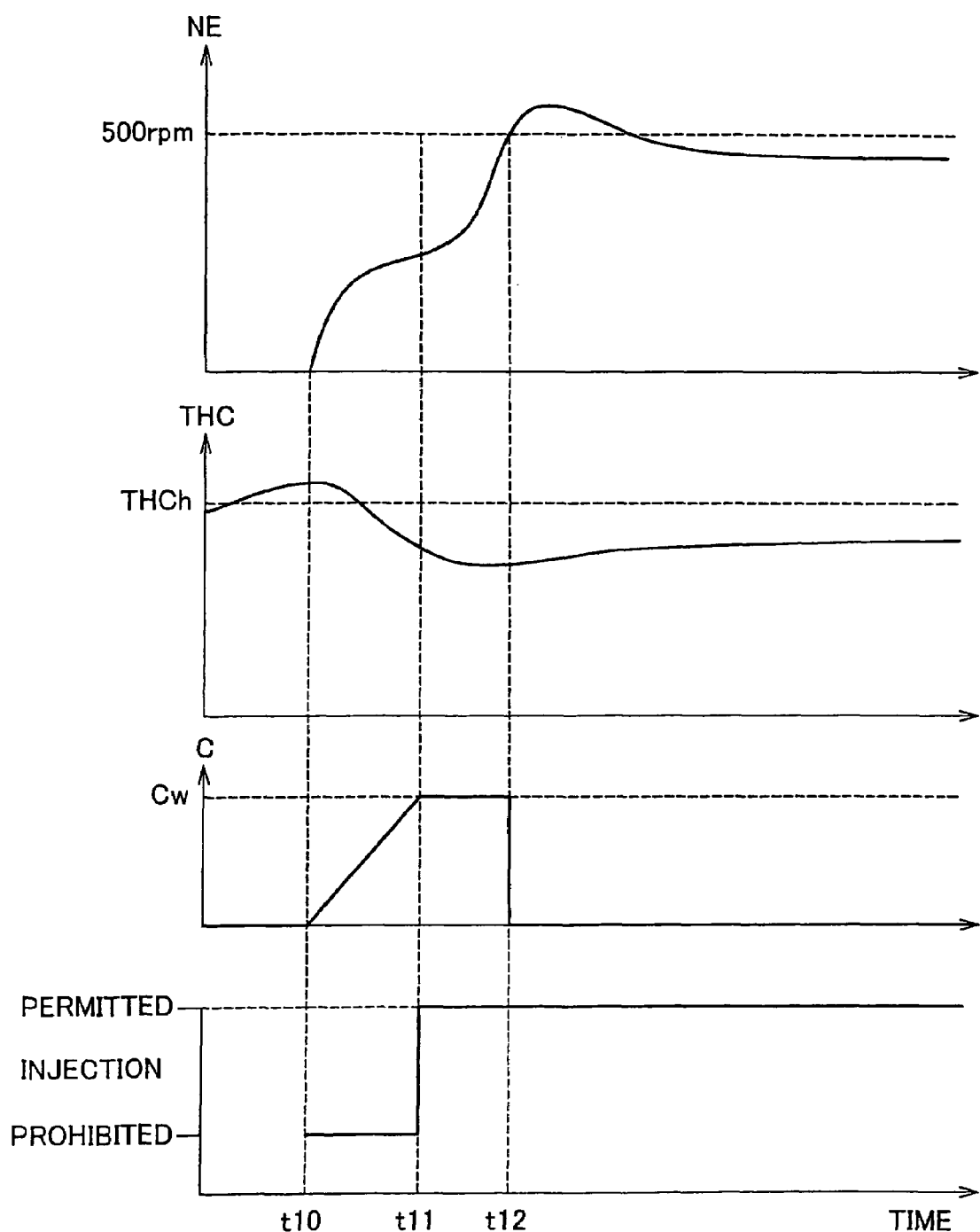
FIG. 4 is a timing chart indicating an example of processing in Embodiment 1.

FIGS. 3, 4 are timing charts indicating examples of control performed in this embodiment. FIG. 3 indicates a case where THC<THCh is satisfied at the time of initiation of the engine startup by the starter 36. At a time point t0 when the cranking is started, the determination of "NO" in step S120 (THC<THCh) is immediately made, so that fuel injection is permitted (S170). Therefore, fuel injection from the fuel injection valves 37 into the combustion chamber is immediately started. Hence, the engine 2 promptly reaches the complete combustion state, so that at a time point t1, the engine rotation speed NE≧500 rpm is reached and the startup is completed.

FIG. 4 indicates a case where THC>THCh is satisfied at the time of the automatic engine startup by the MG 26. Although the cranking is started at a time point t10, fuel injection is prohibited in step S160, so that fuel injection from the fuel injection valves 37 is not performed. At a time point t11 of elapse of a time corresponding to the reference delay value Cw from the start of the cranking, fuel injection from the fuel injection valves 37 is started. Thus, during the period from t10 to t11, cooling water circulates and only external air passes through the combustion chambers without combustion, so that the combustion chambers are efficiently cooled. Due to fuel injection performed after the time point t11, the engine 2 promptly reaches complete combustion. At a time point t12, the engine rotation speed NE≧500 rpm is reached, and the engine startup is completed. A similar process occurs in the case of a manual startup using the starter 36.

In the above-described construction, steps S110 to S130 correspond to a process performed by a high-temperature startup determining portion, and steps S140 to S170 correspond to a process performed by a fuel injection start timing setting portion.

According to Embodiment 1, the following advantages are achieved.

(a) As described above, if it is determined that the present startup is a high-temperature startup ("YES" at S120), immediate fuel injection upon start of the cranking is prohibited ("YES" at S140 followed by step S160). Fuel injection is started (S170) after the delay period elapses following the start of the cranking ("NO" at S140), or when THC<THCh is satisfied ("NO" at S120). Therefore, the cranking during the delay period cools the interior of the combustion chambers. Since fuel injection is started after the cooling, spontaneous ignition of mixture prior to spark ignition is prevented as fuel is injected directly into the cooled combustion chambers. Thus, pre-ignition can be prevented both in the case of automatic startup and the case of a manual startup caused by a driver.

(b) The reference delay value Cw is set as a value corresponding to a length of time that is needed for the cooling water present outside the engine immediately prior to the start of cranking to reach a surrounding of the combustion chambers and reduce the temperature in the combustion chambers. Therefore, pre-ignition can be more effectively prevented.

Embodiment 2

Figure 5:
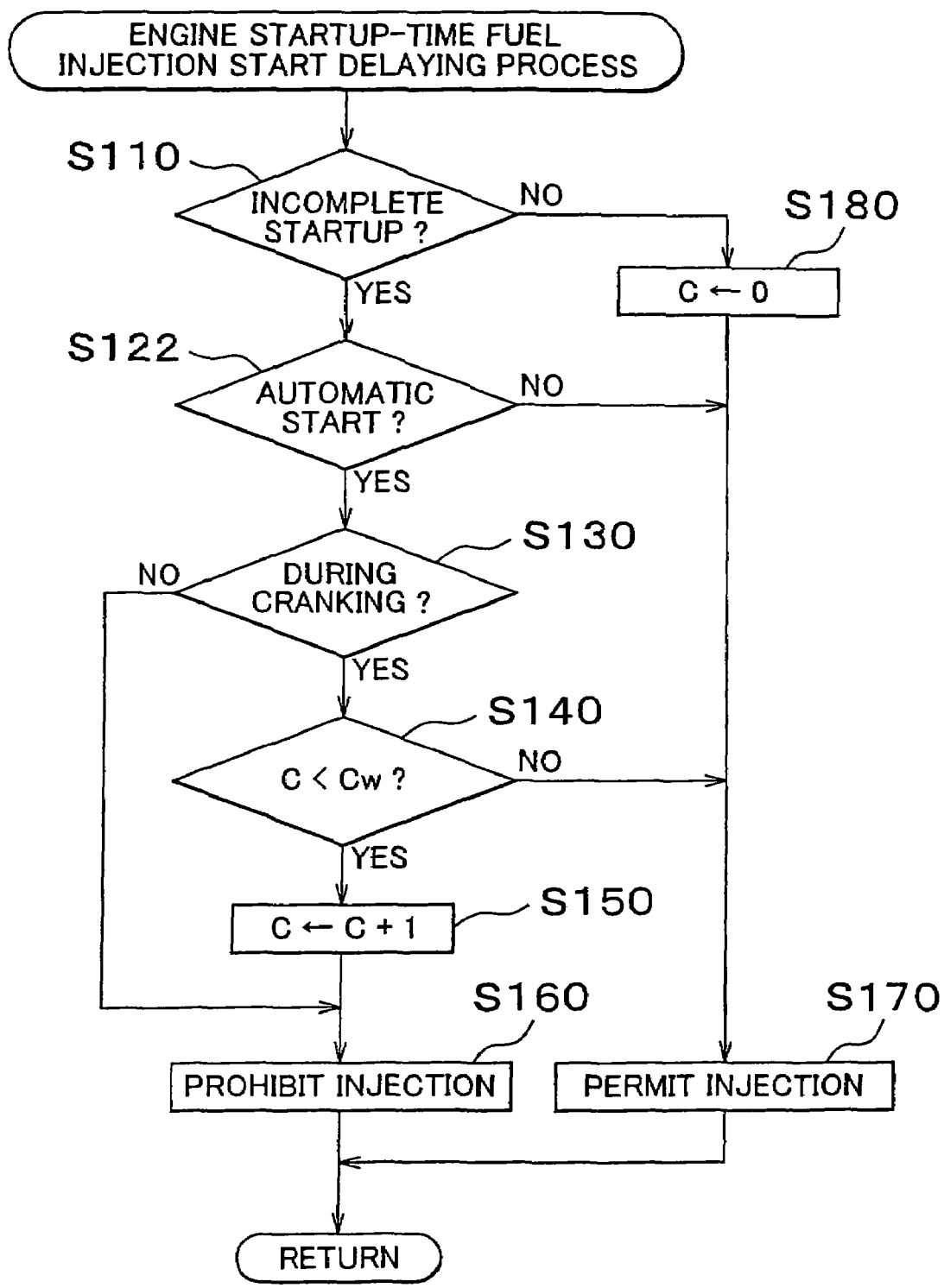
FIG. 5 is a flowchart illustrating an engine startup-time fuel injection start delaying process executed by an engine ECU in Embodiment 2.

This embodiment differs from Embodiment 1 in that the engine ECU 50 executes an engine startup-time fuel injection start delaying process illustrated in FIG. 5 at every 120° CA, instead of the process illustrated in FIG. 2. The engine startup-time fuel injection start delaying process (FIG. 5) is substantially the same as the process of FIG. 2, except that step S122 is executed in placed of step S120. Step S122 corresponds to a process performed by the automatic startup determining portion.

That is, if there is an incomplete startup state ("YES" at S110), it is then determined whether the startup is an automatic startup (S122). If the startup is not an automatic startup but is a manual startup ("NO" at S122), fuel injection from the fuel injection valves 37 is immediately permitted (S170). Then, the process temporarily ends without any further processing.

Conversely, if the startup is an automatic startup ("YES" at S122), the process of steps S130 to S160 is executed as described above in conjunction with Embodiment 1, whereby during a period corresponding to the reference delay value Cw, fuel injection from the fuel injection valves 37 is not performed but only the cranking by the MG 26 is performed. If C=Cw is reached ("NO" at S140), fuel injection from the fuel injection valves 37 is performed (S170). Therefore, combustion starts as is also illustrated in FIG. 4. After that, the startup is completed ("NO" at S110).

In the above-described construction, the engine startup-time fuel injection start delaying process (FIG. 5) corresponds to a process performed by the fuel injection start timing setting portion.

According to Embodiment 2 described above, the following advantages are achieved.

(a) Particularly in this engine 2, if the automatic stop-automatic startup is performed, the interval from the automatic stop to the automatic start is generally short, so that there occurs a high incidence of engine startup at a timing at which the combustion chamber temperature is high after the circulation of cooling water is stopped. Therefore, if it is determined that the startup is an automatic start ("YES" at S122), immediate fuel injection upon start of cranking is prohibited (S160). After the delay period elapses following the start of cranking ("NO" at S140), fuel injection is started (S170). Thus, the cranking during the delay period cools the interior of the combustion chambers, thereby preventing pre-ignition, as mentioned above.

(b) It is not necessary to compute the combustion chamber temperature THC by periodically integrating the heat balance of the amount of heat generated, the amount of heat released, the amount of heat absorbed, unlike Embodiment 1. Therefore, the computation load on the engine ECU 50 is reduced. Thus, other processes can be more quickly executed. It becomes also possible to construct the engine ECU 50 using a low-cost CPU.

(c) An advantage the same as the advantage (b) of Embodiment 2 can be achieved.

Embodiment 3

Figure 6:
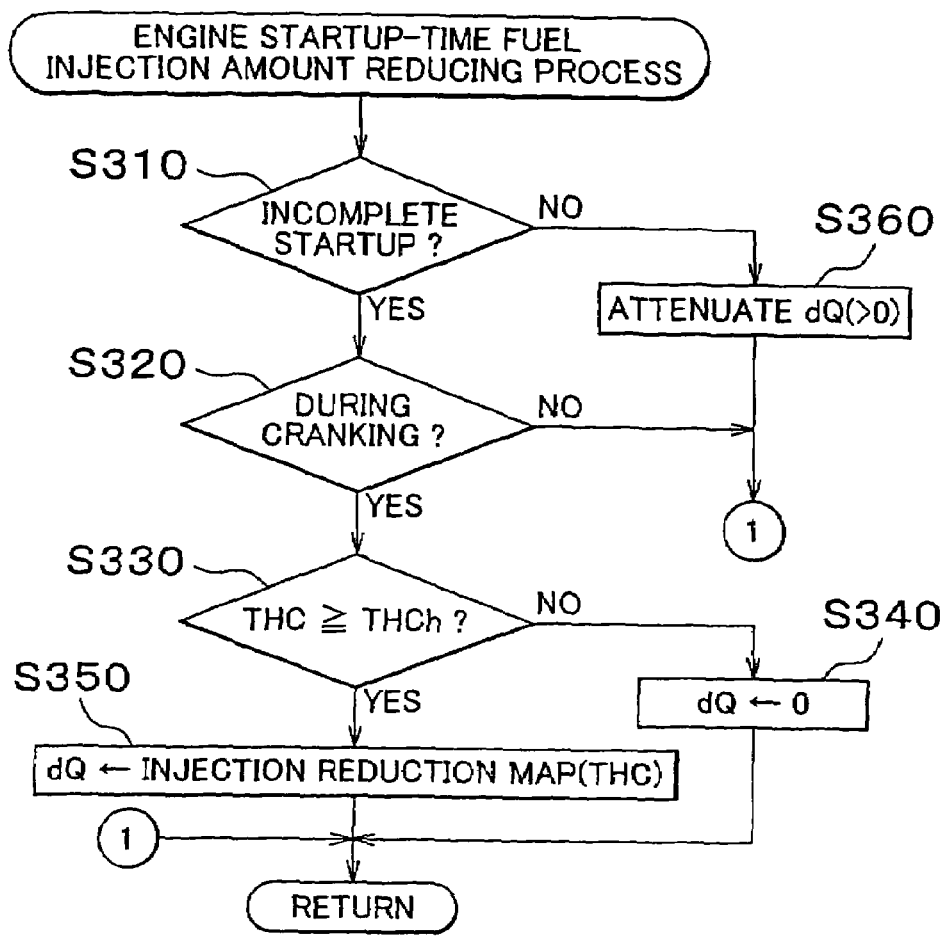
FIG. 6 is a flowchart illustrating an engine startup-time fuel injection start delaying process executed by an engine ECU in Embodiment 3.

This embodiment differs from Embodiment 1 in that the engine ECU 50 executes an engine startup-time fuel injection amount reducing process illustrated in FIG. 6 at every 120° CA, instead of the process illustrated in FIG. 2.

When the engine startup-time fuel injection amount reducing process (FIG. 6) starts, it is first determined whether there is a startup (including an automatic start and a manual startup) that is yet to be completed (S310). If there is an incomplete startup state ("YES" at S310), it is then determined whether cranking is being performed (S320). If cranking is not being performed ("NO" at S320), the process temporarily ends without any further processing.

If cranking is being performed ("YES" at S320), it is then determined whether the combustion chamber temperature THC is higher than or equal to the high-temperature criterion THCh (S330). If THC<THCh ("NO" at S330), a reducing correction value dQ for reducing the amount of fuel injection at the time of startup is set at "0 ($mm^3$/one injection, which unit for the amount of fuel injection will be omitted below)" (S340). Then, the process temporarily ends. Therefore, in this case, the reducing correction using the reducing correction value dQ is not performed with respect to the amount of fuel injection at the time of startup.

Figure 7:
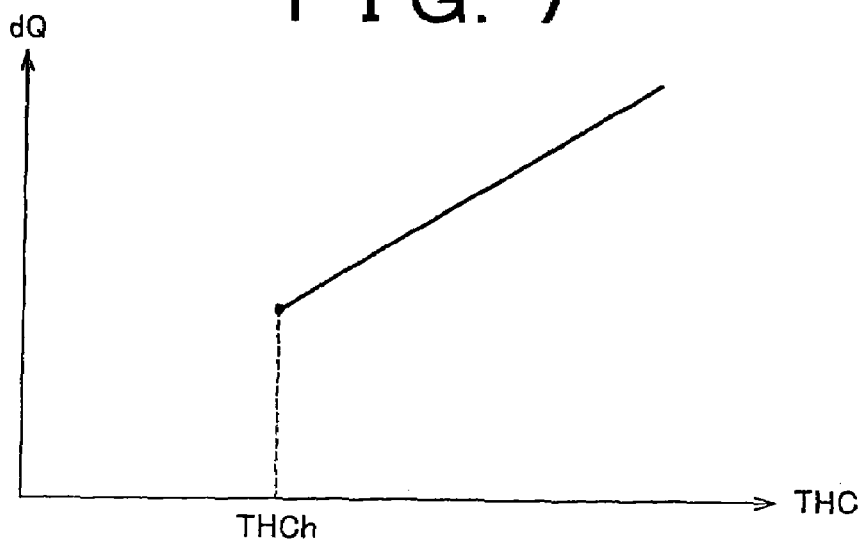
FIG. 7 illustrates the construction of a map used in the process illustrated in FIG. 6.

Conversely, if THC≧THCh ("YES" at S330), a reducing correction value dQ is computed based on the value of combustion chamber temperature THC with reference to a fuel injection amount reducing map illustrated in FIG. 7 (S350). As is apparent from FIG. 7, the reducing correction value dQ is increased with increases in the combustion chamber temperature THC provided that the combustion chamber temperature THC is higher than or equal to the high-temperature criterion THCh. Therefore, within the range of THC≧THCh, if the combustion chamber temperature THC is higher, the amount of fuel injection at the time of startup becomes smaller.

Due to the reducing correction value dQ set as described above, the amount of fuel injection is kept reduced until the startup is completed. When the startup is completed ("NO" at S310), an attenuating process of decreasing the reducing correction value dQ if dQ>0 is performed (S360) in every control cycle until the reducing correction value dQ reaches "0". If the reducing correction value dQ=0 initially holds, the attenuating process of step S360 is not performed in effect. When the reducing correction value dQ=0 is reached, the substantial process of FIG. 6 ends.

In the above-described construction, the process of steps S310 to S330 corresponds to a process performed by the high-temperature startup determining portion, and step S350 corresponds to a process performed by the startup-time fuel injection amount setting portion.

According to Embodiment 3 described above, the following advantages are achieved.

(a) If the startup is a high-temperature startup ("YES" at S330), the amount of fuel injection at the time of startup is reduced by setting a reducing correction value dQ with reference to a map. Therefore, pre-ignition becomes less likely to occur, and even if pre-ignition occurs, the amount of heat generated can be kept at a reduced level. Hence, damage to the engine 2 can be reduced.

Embodiment 4

Figure 8:
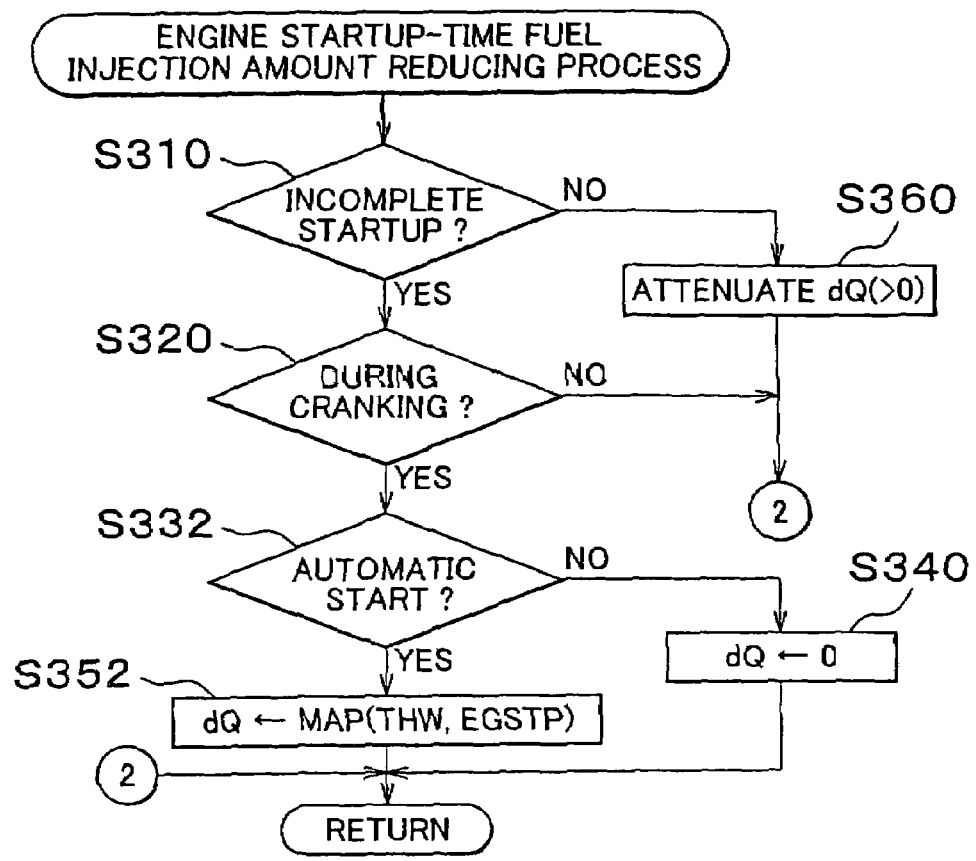
FIG. 8 is a flowchart illustrating an engine startup-time fuel injection amount reducing process executed by an engine ECU in Embodiment 4.

This embodiment differs from Embodiment 3 in that the engine ECU 50 executes an engine startup-time fuel injection amount reducing process illustrated in FIG. 8 at every 120° CA, instead of the process illustrated in FIG. 6. The process of FIG. 8 differs from the process of FIG. 6 in that step S332 is performed in place of step S330, and step S352 is executed in place of step S350.

If there is an incomplete startup state ("YES" at S310) and cranking is being performed ("YES" at S320), it is then determined whether the startup is an automatic start (S332). If the startup is not an automatic start but is a manual start ("NO" at S332), the reducing correction value dQ is set at "0" (S340).

Figure 9:
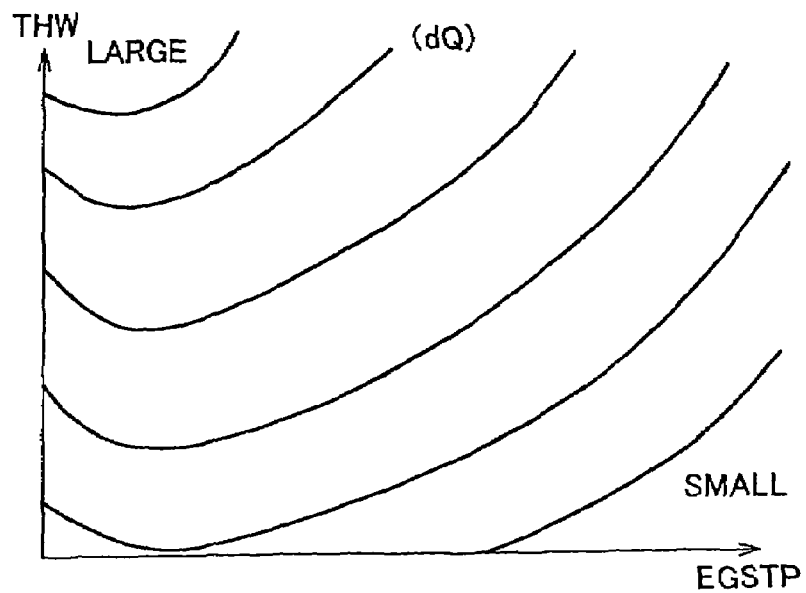
FIG. 9 illustrates the construction of a map used in the process illustrated in FIG. 8.

Conversely, if the startup is an automatic start ("YES" at S332), a reducing correction value dQ is computed based on the present engine cooling water temperature THW and a present engine stop duration counter EGSTP with reference to a reducing correction value dQ map indicated in FIG. 9. The engine stop duration counter EGSTP is a counter that the engine ECU 50 uses to measure the stop duration of the engine 2 at every automatic engine stop.

The temperature in the combustion chamber tends to increase with increases in the engine cooling water temperature THW. With regard to the stop duration of the engine 2, the combustion chamber temperature temporarily becomes high during an initial period of the stop. After that, the combustion chamber temperature tends to become lower with increases in the stop duration. Therefore, in a map indicated in FIG. 9, the reducing correction value dQ is set greater as the engine cooling water temperature THW is higher, as indicated by contour lines, and the reducing correction value dQ is set so as to form peaks in a region where the value of the engine stop duration counter EGSTP is small.

If the reduction of the amount of fuel injection using the reducing correction value dQ set as described above is continued and the startup is completed ("NO" at S310), the reducing correction value dQ attenuating process is executed (S360). When the reducing correction value dQ=0 is reached, substantial process illustrated in FIG. 8 ends.

In the above-described construction, the engine startup-time fuel injection amount reducing process (FIG. 8) corresponds to a process performed by the startup-time fuel injection amount setting portion.

According to Embodiment 4 described above, the following advantages are achieved.

(a) If the automatic stop-automatic start is performed with the engine 2, the incidence of an engine startup at a timing at which the combustion chamber becomes high increases. Therefore, if it is determined that the startup is an automatic start ("YES" at S332), the amount of fuel injection is reduced by setting a reducing correction value dQ with reference to the map of FIG. 9. Hence, pre-ignition becomes unlikely to occur, and if pre-ignition occurs, damage to the internal combustion engine can be reduced.

(b) An advantage the same as the advantage (b) of the Embodiment 2 is achieved.

Embodiment 5

Figure 10:
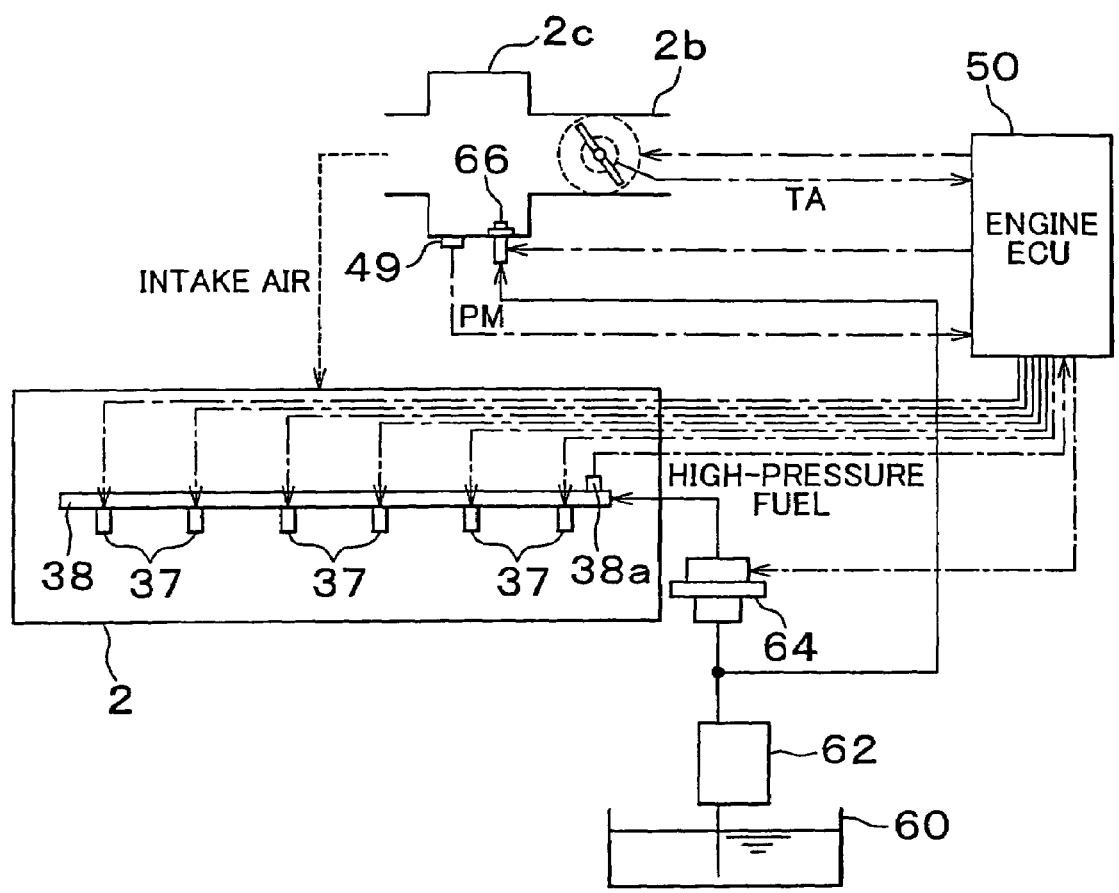
FIG. 10 illustrates a construction of a fuel supply system in Embodiment 5.

Fuel pumped from a fuel tank 60 by a feed pump 62 is pressurized and is supplied to the delivery pipe 38 by a high-pressure pump 64 as indicated in FIG. 10. The engine ECU 50 detects the fuel pressure in the delivery pipe 38 by using a fuel pressure sensor 38a, and adjusts the amount of ejection from the high-pressure pump 64 to the delivery pipe 38 so as to achieve a fuel pressure corresponding to the state of operation of the engine 2. The construction of this high-pressure fuel supplying system is the same as that in Embodiment 1. This embodiment differs in construction from Embodiment 1 in that low-pressure fuel supplied from the feed pump 62 is supplied to an auxiliary fuel injection valve 66 provided in the surge tank 2c. With this construction, the engine ECU 50 is able to cause injection of fuel from the auxiliary fuel injection valve 66 into the surge tank 2c independently of fuel injection valves 37 for injecting fuel into the combustion chambers.

Figure 11:
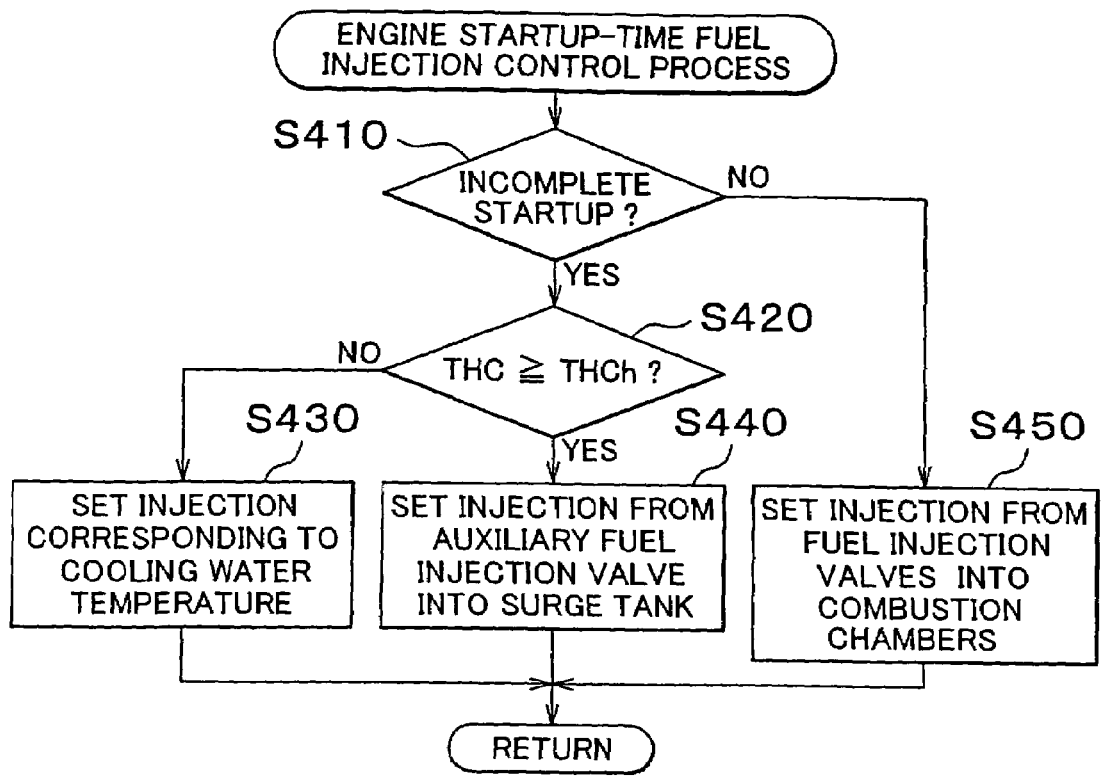
FIG. 11 is a flowchart illustrating an engine startup-time fuel injection control process executed by an engine ECU in Embodiment 6.

Furthermore, this embodiment differs from Embodiment 1 in that the engine ECU 50 executes an engine startup-time fuel injection control process illustrated in FIG. 11 at every 120° CA, instead of the process illustrated in FIG. 2.

Figure 12:
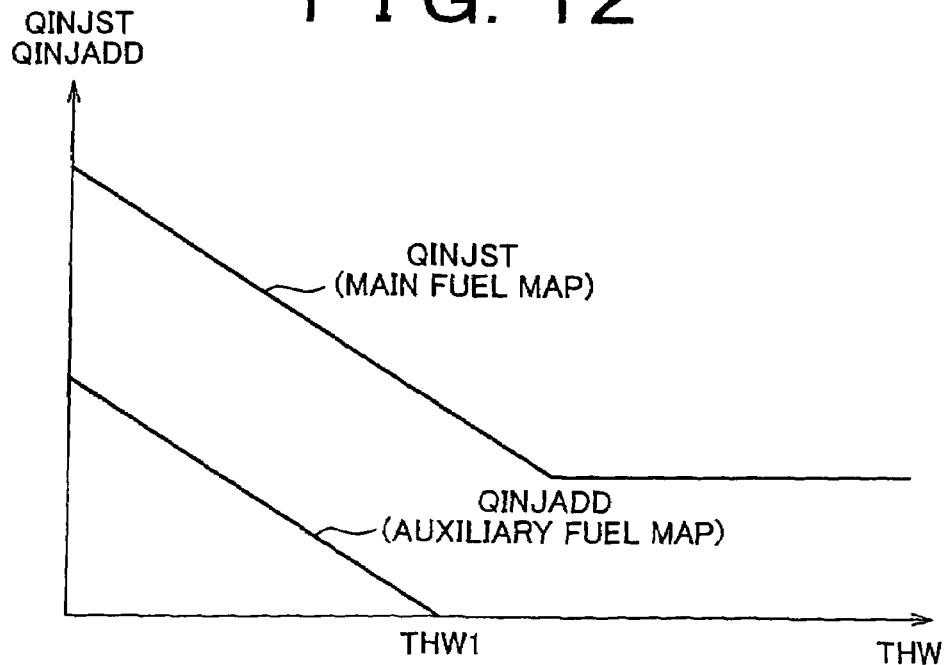
FIG. 12 illustrates a construction of a fuel supply system in Embodiment 7.

The engine startup-time fuel injection control process (FIG. 11) will be described. When this process starts, it is first determined whether the startup is incomplete (S410). If a yet-to-be completed startup state is present ("YES" at S410), it is then determined whether the combustion chamber temperature THC is higher than or equal to the high-temperature criterion THCh (S420). If THC<THCh ("NO" at S420), a main fuel injection amount QINJST injected from the fuel injection valves 37 and an auxiliary fuel injection amount QINJADD injected from the auxiliary fuel injection valve 66 are set based on the engine cooling water temperature THW with reference to a map indicated in FIG. 12 (S430). The main fuel injection amount QINJST becomes greater at low temperatures. The auxiliary fuel injection amount QINJADD is provided if the engine cooling water temperature THW is less than or equal to a low-temperature criterion temperature THW1. The auxiliary fuel injection amount QINJADD becomes greater with decreases in temperature. Thus, if THC<THCh, the fuel injection valves 37 and the auxiliary fuel injection valve 66 are caused to inject fuel at the time of a cold start (THW≦THW1) in accordance with the engine cooling water temperature THW. In the other situations, fuel is injected from only the fuel injection valves 37.

If THC≧THCh ("YES" at S420), fuel injection from only the auxiliary fuel injection valve 66 is executed (S440), that is, an amount of fuel needed at the time of startup is injected from the auxiliary fuel injection valve 66 into the surge tank 2c. Therefore, during a high-temperature state of the combustion chambers, fuel is not injected directly into the combustion chambers, but is supplied into the combustion chambers via intake ports in the form of air-fuel mixture.

After that, the engine 2 reaches the complete combustion state, and the engine rotation speed NE rises, so that the startup is completed ("NO" at S410). Then, fuel injection only from the fuel injection valves 37 into the combustion chambers is performed (S450).

In the above-described construction, steps S410, S420 correspond to a process performed by the high-temperature startup determining portion, and steps S430, S440 correspond to a process performed by a startup-time fuel injection selecting portion.

According to Embodiment 5 described above, the following advantages are achieved.

(a) In the case of a high-temperature startup ("YES" at S420), fuel injection at the time of startup is accomplished by fuel injection from the auxiliary fuel injection valve 66 into the surge tank 2c. The avoidance of direct fuel injection into the combustion chambers in this manner makes pre-ignition unlikely. In the case where the startup is not a high-temperature startup ("NO" at S420), the fuel injection at the time of startup can be accomplished by fuel injection into the combustion chambers if temperature is not low, and by fuel injection into the combustion chambers and the intake passage if temperature is low (S430). Therefore, fuel can be supplied into the combustion chambers at an early stage, and combustion can be promptly started. At the time of low temperature, fuel is injected from the auxiliary fuel injection valve 66 as well, so that fuel atomization becomes good and engine startup characteristic improves.

Embodiment 6

Figure 13:
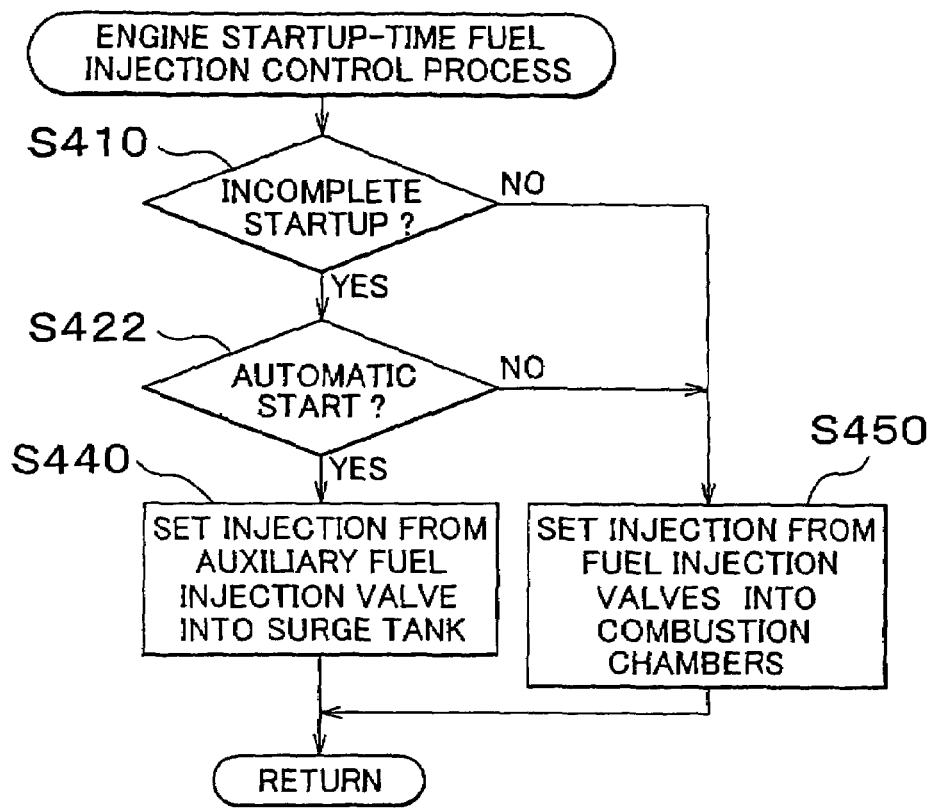
FIG. 13 is a flowchart illustrating an engine startup-time fuel injection control process executed by an engine ECU in Embodiment 6.

This embodiment differs from Embodiment 5 in that the engine ECU 50 executes an engine startup-time fuel injection control process illustrated in FIG. 13 at every 120° CA, instead of the process of FIG. 11.

When the engine startup-time fuel injection control process (FIG. 13) starts, it is first determined whether the startup is incomplete (S410). If an incomplete startup state is present ("YES" at S410), it is then determined whether the startup is an automatic start (S422). If the startup is not an automatic start ("NO" at S422), an amount of fuel needed at the time of startup is injected from the fuel injection valves 37 into the combustion chambers (S450).

Conversely, if the startup is an automatic start ("YES" at S422), fuel injection from only the auxiliary fuel injection valve 66 is executed (S440), so that an amount of fuel needed at the time of startup is injected from the auxiliary fuel injection valve 66 into the surge tank 2c. Therefore, in the case of an automatic start where there is a high possibility that the combustion chambers have a high-temperature state, fuel is not injected directly into the combustion chambers, but is supplied into the combustion chambers via intake ports in the form of air-fuel mixture.

After that, the engine 2 reaches the complete combustion state, and the engine rotation speed NE rises, so that the startup is completed ("NO" at S410). Then, fuel injection only from the fuel injection valves 37 into the combustion chambers is performed (S450).

In the foregoing construction, the engine startup-time fuel injection control process (FIG. 13) corresponds to a process performed by the startup-time fuel injection selecting portion.

According to Embodiment 6 described above, the following advantages are achieved.

(a) In the case of an automatic start ("YES" at S422), it is highly possible that the combustion chambers have high temperature. Therefore, the fuel injection at the time of startup is accomplished by performing fuel injection from the auxiliary fuel injection valve 66 into the surge tank 2c without performing fuel injection from the fuel injection valves 37 (S440). The avoidance of direct fuel injection into the combustion chambers in this manner makes pre-ignition unlikely. Furthermore, in the case of startup other than the automatic start ("NO" at S422), fuel is injected into the combustion chambers (S450). Therefore, fuel can be supplied into the combustion chambers at an early stage, and combustion can be promptly started, so that engine startup characteristic will improve.

(b) An advantage the same as the advantage (b) of the Embodiment 2 is achieved.

Embodiment 7

Figure 14:
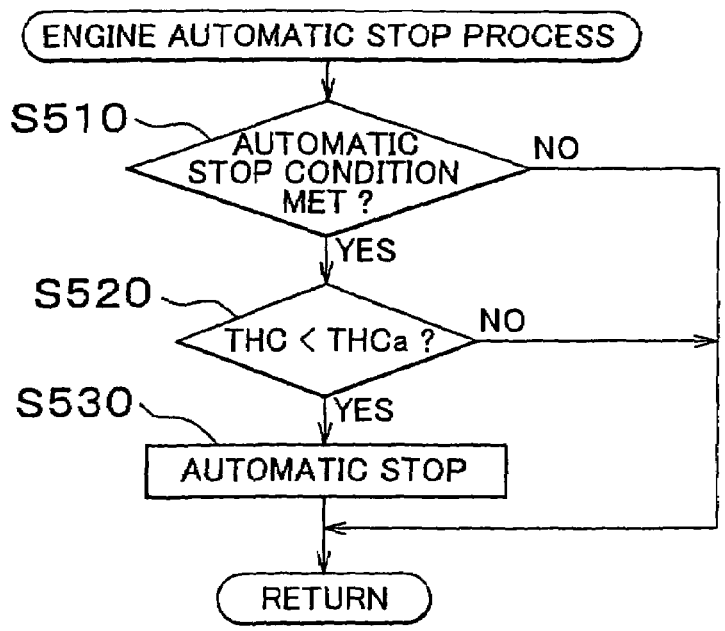
FIG. 14 is a flowchart illustrating an engine automatic stop process executed by an eco-run ECU in Embodiment 7.

This embodiment differs from Embodiment 1 in that the engine ECU 50 does not execute the process of FIG. 2 and the eco-run ECU 40 repeatedly executes an engine automatic stop process illustrated in FIG. 14 in cycles of a short time.

When the eco-run ECU 40 starts the engine automatic stop (FIG. 14), it is first determined whether an automatic stop condition is met (S510). For example, it is determined that the automatic stop condition is met if all the following conditions (1) to (5) are satisfied: (1) a condition that the engine 2 is already warmed up, but is not overheated (the engine cooling water temperature THW is lower than a water temperature upper limit value, and is higher than a water temperature lower limit value); (2) a condition that the accelerator pedal is not depressed; (3) a condition that the states of charge of the batteries 30, 34 are at respectively needed levels; (4) a condition that the brake pedal is not depressed; and (5) a condition that the vehicle is in a stopped state (the vehicle speed SPD being 0 km/h).

If any one of the conditions (1) to (5) is unsatisfied, the automatic stop condition is not met ("NO" at S510). Then, the process temporarily ends.

Conversely, if the automatic stop condition is met due to, for example, a driver stopping the vehicle at an intersection or the like ("YES" at S510), it is subsequently determined whether the combustion chamber temperature THC is less than a high-temperature prediction criteria THCa (S520). The high-temperature prediction criteria THCa is a criterion value which is smaller than the high-temperature criterion THCh, and which indicates that there is high possibility that if the engine is automatically stopped with the combustion chamber temperature THC being higher than or equal to the high-temperature prediction criteria THCa, the combustion chamber temperature THC will be higher than or equal to the high-temperature criterion THCh at the time of automatic start.

If THC<THCa ("YES" at S520), the automatic stop process is executed (S530), and then the process temporarily ends.

In this automatic stop process (S530), the eco-run ECU 40 outputs a fuel-cut command to the engine ECU 50, whereby the fuel injection from the fuel injection valves 37 and the throttle valve 48 is completely closed. Therefore, combustion in the combustion chambers stops, and revolution of the engine 2 stops.

If THC≧THCa ("NO" at S520), the automatic stop (S530) is not executed, and the process temporarily ends without any further processing. Thus, if the automatic stop condition is met (("YES" at S510), the automatic stop is avoided in a case where the combustion chamber temperature THC is at a relatively high level. In that case, therefore, the automatic start is not performed either.

In the above-described construction, steps S510, S520 correspond to a process performed by the high-temperature determining portion, and the process of determining whether to perform the process of step S530 depending on the determination made in step S520 corresponds to a process performed by an automatic stop execution control portion.

According to Embodiment 7 described above, the following advantages are achieved.

(a) If the engine 2 has relatively high temperature when the automatic stop is to be executed, immediate execution of automatic stop will highly likely lead to a further increased temperature in the combustion chambers at the time of automatic start. Therefore, if at the time of satisfaction of the automatic stop condition ("YES" at S510), the combustion chamber temperature THC is relatively high ("NO" at S520), execution of the automatic stop is prohibited, so that the automatic start is not executed. Therefore, pre-ignition at the time of automatic start can be prevented.

Embodiment 8

Figure 15:
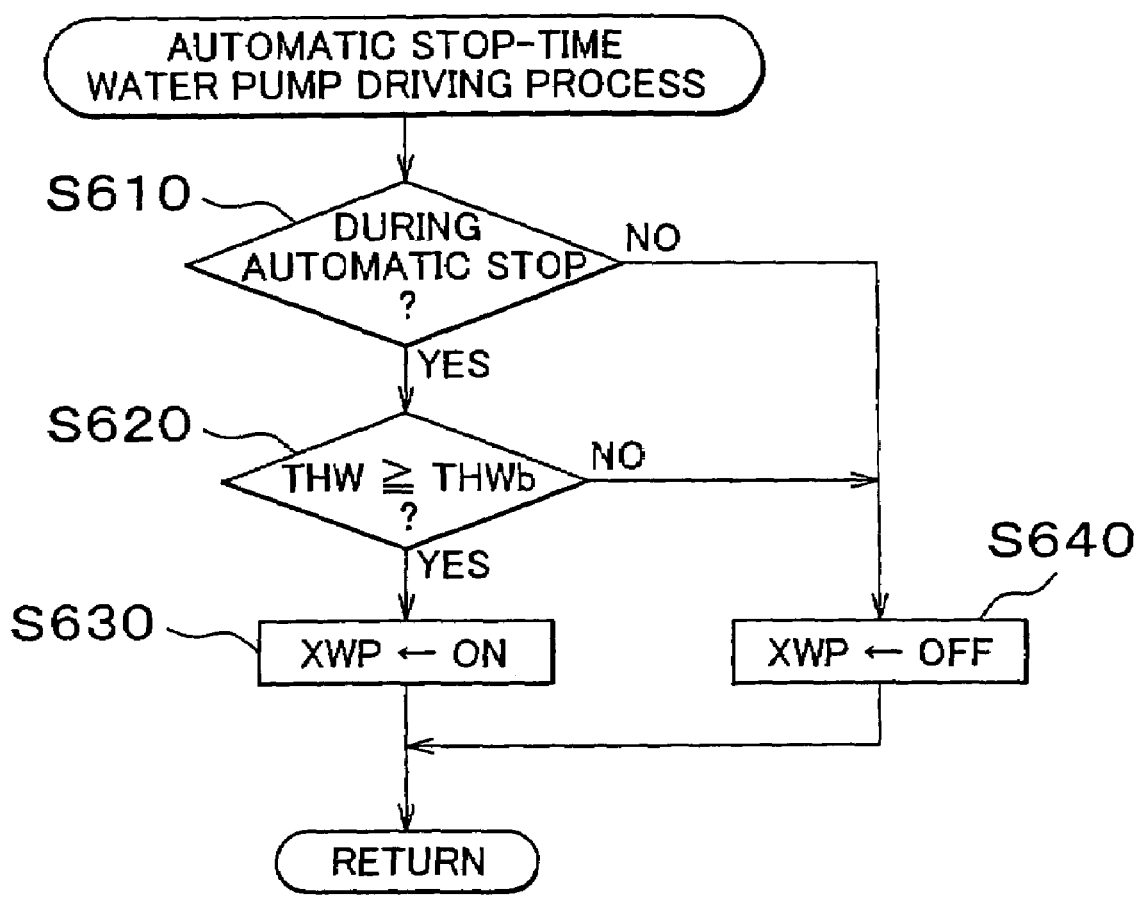
FIG. 15 is a flowchart illustrating an automatic stop-time water pump driving process executed by an eco-run ECU in Embodiment 8.

This embodiment differs from Embodiment 1 in that the engine ECU 50 does not execute the process of FIG. 2 and the eco-run ECU 40 repeatedly executes an automatic stop-time water pump driving process illustrated in FIG. 15 in cycles of a short time.

When the automatic stop-time water pump driving process (FIG. 15) starts, it is first determined whether automatic stop is being executed (S610). If automatic stop is being executed ("YES" at S610), it is subsequently determined whether the engine cooling water temperature THW is higher than or equal to a cooling execution criterion THWb (S620). The cooling execution criterion THWb is a criterion for indicating that there is a possibility of pre-ignition at the time of automatic start if the engine cooling water temperature THW is lower than the cooling execution criterion THWb.

If THW≧THWb ("YES" at S620), a water pump drive flag XWP is set to an "ON" state (S630), and the process temporarily ends. If the water pump drive flag XWP is "ON", the electromagnetic clutch 10a is disengaged by a separately-executed MG 26-driving process, and the MG 26 is set in the drive mode where the MG 26 is operated by electric energy from the battery 30, and therefore drives the engine-cooling water pump, that is, an accessory 22, via the pulley 18, the belt 14 and the pulley 16. If the MG 26 is already set in the drive mode due to a request for driving the airconditioner compressor or the power steering pump, the drive mode is continued. Therefore, even if rotation of the engine 2 is stopped, cooling water can be circulated in the engine 2 to reduce the combustion chamber temperature THC.

Conversely, if THW<THWb ("NO" at S620), the water pump drive flag XWP is set to an "OFF state (S640), and the process temporarily ends.

If the water pump drive flag XWP is set to the "OFF" state, rotation of the MG 26 is stopped, so that the engine-cooling water pump is not driven. However, if there is a request for driving the airconditioner compressor or the power steering pump, the MG 26 operates in the drive mode despite XWP="OFF".

In the above-described construction, step S620 corresponds to a process performed by a high-temperature determining portion, and steps S610, S630 correspond to a process performed by a pre-startup cooling portion.

According to Embodiment 8 described above, the following advantages are achieved.

(a) If during the automatic stop, the engine cooling water temperature THW is higher than or equal to the cooling execution criterion THWb ("YES" at S620), execution of automatic start without any change from the present state will highly likely cause pre-ignition. Therefore, the engine 2 is cooled by the MG 26 actively driving the engine-cooling water pump (S630), so that the pre-ignition at the time of automatic start can be prevented.

(b) An advantage the same as the advantage (b) in Embodiment 2 is achieved.

Embodiment 9

Figure 16:
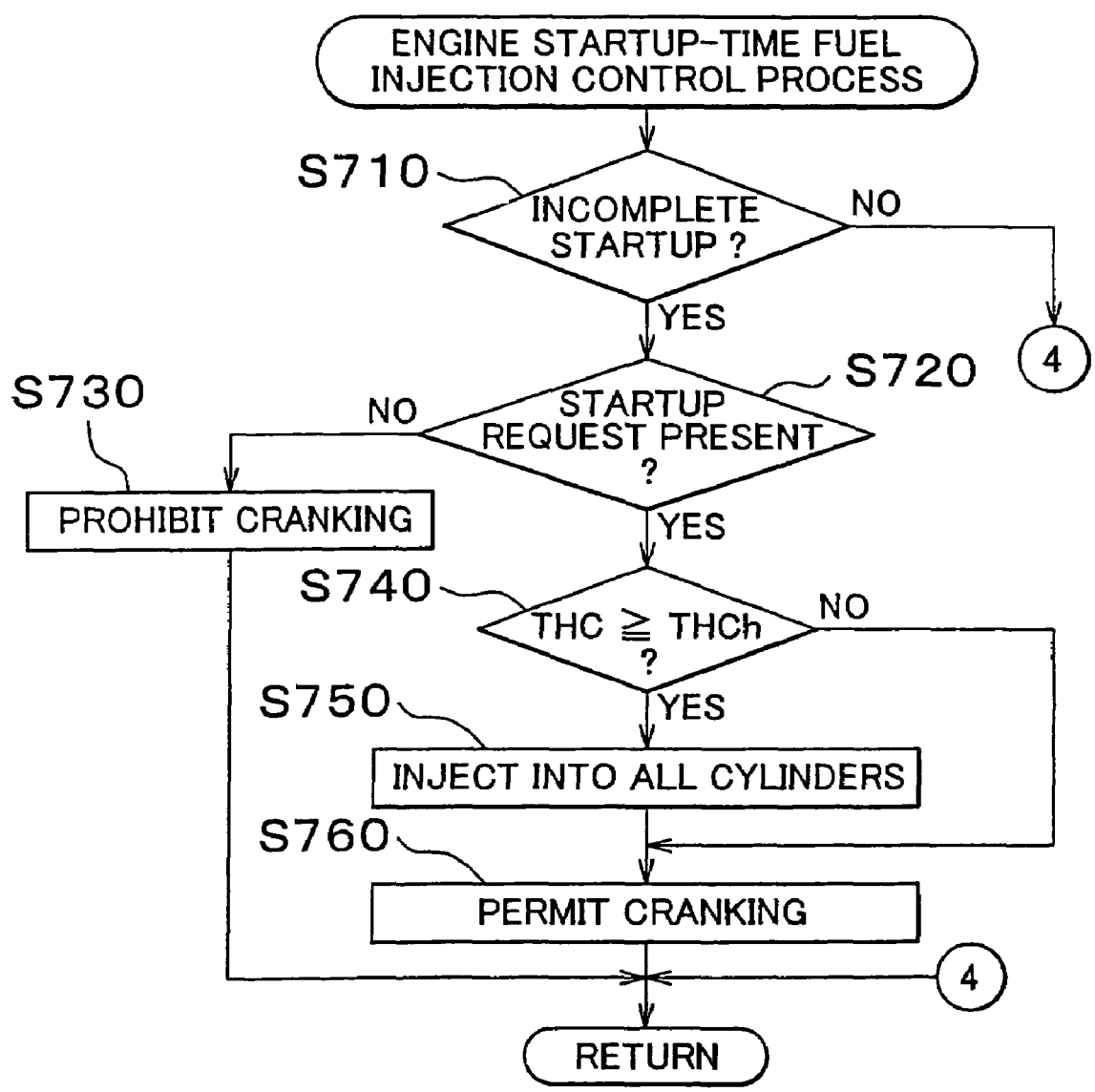
FIG. 16 is a flowchart illustrating an engine startup-time fuel injection control process executed by an engine ECU in Embodiment 9.

This embodiment differs from Embodiment 1 in that the engine ECU 50 repeated executes an engine startup-time fuel injection control process illustrated in FIG. 16 in short-time cycles, instead of the process illustrated in FIG. 2.

When the engine startup-time fuel injection control process (FIG. 16) starts, it is determined whether an incomplete startup is present (S710). If an incomplete startup state is present ("YES" at S710), it is then determined whether there is a startup request (S720). If there is no request for an automatic start or a manual start ("NO" at S720), prohibition of cranking is set (S730), and then the process temporarily ends. The setting of prohibition of cranking is made so that if a startup request is output based on automatic startup or manual startup, the engine ECU 50 is allowed to turn the crankshaft 2a by using the MG 26 or the starter 36 only after a cranking permission setting (described below) is made (S760).

Conversely, if there is a startup request ("YES" at S720), it is subsequently determined whether the combustion chamber temperature THC is higher than or equal to the high-temperature criterion THCh (S740). If THC<THCh ("NO" at S740), the cranking permission is immediately set (S760), and then the process temporarily ends. Thus, if the combustion chamber temperature THC is not in a high range, the presence of a startup request immediately permits cranking, so that cranking starts.

If THC≧THCh ("YES" at S740), fuel is subsequently injected simultaneously into all the cylinders from the fuel injection valves 37 (S750). The purpose of this fuel injection is to cool the high-temperature combustion chambers by heat absorption involved in evaporation of fuel. The amount of fuel injected may be fixed, or may be variably set in accordance with the combustion chamber temperature THC. Although at this moment, cranking is yet to be started and therefore the high-pressure fuel pump is not operated, simultaneous fuel injection from the fuel injection valves 37 can be performed, if performed only once, because sufficiently high residual pressure exists in the delivery pipe 38 at a timing when the combustion chambers have high temperature.

Then, cranking is immediately permitted (S760), and the process temporarily ends. After that, when the startup is completed by cranking ("NO" at S710), substantial process of the engine startup-time fuel injection control process (FIG. 16) ends.

In the foregoing construction, steps S710, S720 and S740 correspond to a process performed by the high-temperature startup determining portion, and steps S730, S750 and S760 correspond to a process performed by a pre-fuel injection setting portion.

According to Embodiment 9 described above, the following advantages are achieved.

(a) In the case of a high-temperature startup ("YES" at S740), the combustion chambers can be cooled due to heat absorption involved in evaporation of the fuel supplied thereinto by injecting fuel into the combustion chambers (S750) before cranking is performed for a startup. At the time of fuel injection prior to cranking, air-fuel mixture formed by injecting fuel into combustion chambers is not immediately compressed, but is allowed to sufficiently evaporate and absorb heat. Therefore, this fuel injection is able to make pre-ignition more unlikely than the fuel injection performed during cranking.

Embodiment 10

Figure 17:
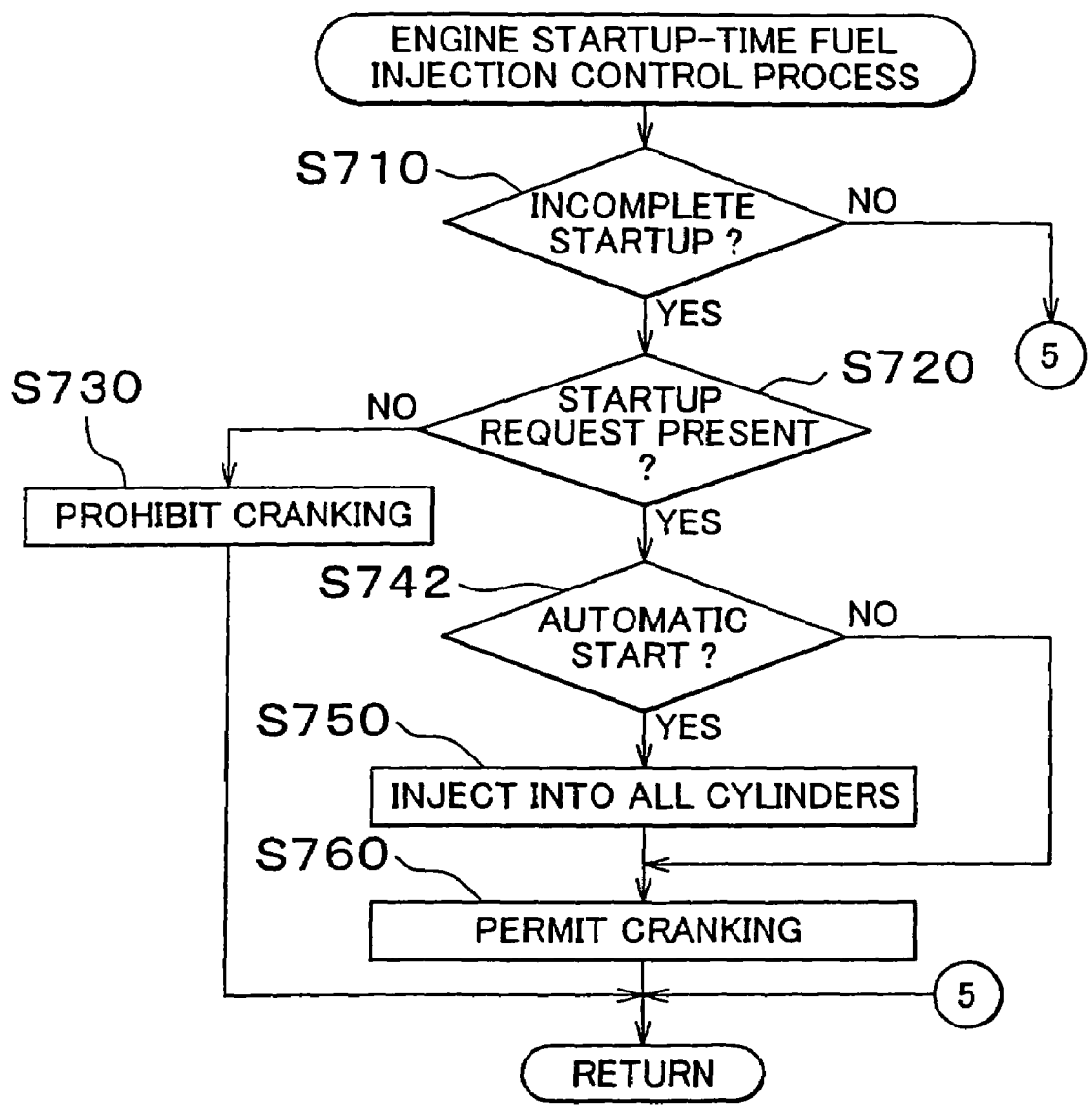
FIG. 17 is a flowchart illustrating an engine startup-time fuel injection control process executed by an engine ECU in Embodiment 10.

This embodiment differs from Embodiment 9 in that the engine ECU 50 repeatedly executes an engine startup-time fuel injection control process illustrated in FIG. 17 in short-time cycles, instead of the process illustrated in FIG. 16. The process of FIG. 17 differs from the process of FIG. 16 in that step S742 is executed in place of step S740.

If there is a startup request ("YES" at S720), it is subsequently determined whether the startup request is based on an automatic start (S742). If the startup request is based on a manual start ("NO" at S742), cranking is immediately permitted (S760), and the process temporarily ends. Thus, in the case of manual start, the probability of a high-temperature startup is considered to be low. Therefore, a startup request based on manual start is immediately followed by permission of cranking, and therefore cranking is immediately started.

In the case of automatic start ("YES" at S742), fuel is injected simultaneously from the fuel injection valves 37 into all the cylinders (S750). The amount of fuel injected in this operation may be a fixed amount, or may be suitably set in accordance with an engine stop duration counter EGSTOP that measures the stop duration of the engine 2. For example, if the stop duration is several minutes or shorter, a fixed amount of fuel is injected. If the stop duration is longer than that, fuel injection is avoided. Such simultaneous fuel injection is accomplished by residual pressure in the delivery pipe 38.

After the simultaneous fuel injection at step S750, cranking is immediately permitted (S760), and then the process temporarily ends. After that, when the startup is completed by cranking ("NO" at S710), substantial process of the engine startup-time fuel injection control process (FIG. 17) ends.

In the foregoing construction, the engine startup-time fuel injection control process (FIG. 17) corresponds to a process performed by the pre-fuel injection setting portion. According to Embodiment 10 described above, the following advantages are achieved.

(a) In the case of automatic start ("YES" at S742), fuel is injected into the combustion chambers (S750) regardless of a high-temperature condition, before cranking is performed for the startup. Therefore, heat absorption involved in evaporation of injected fuel cools the combustion chambers, and therefore makes pre-ignition less likely.

(b) An advantage the same as the advantage (b) of Embodiment 2 is achieved.

Embodiment 11

Figure 18:
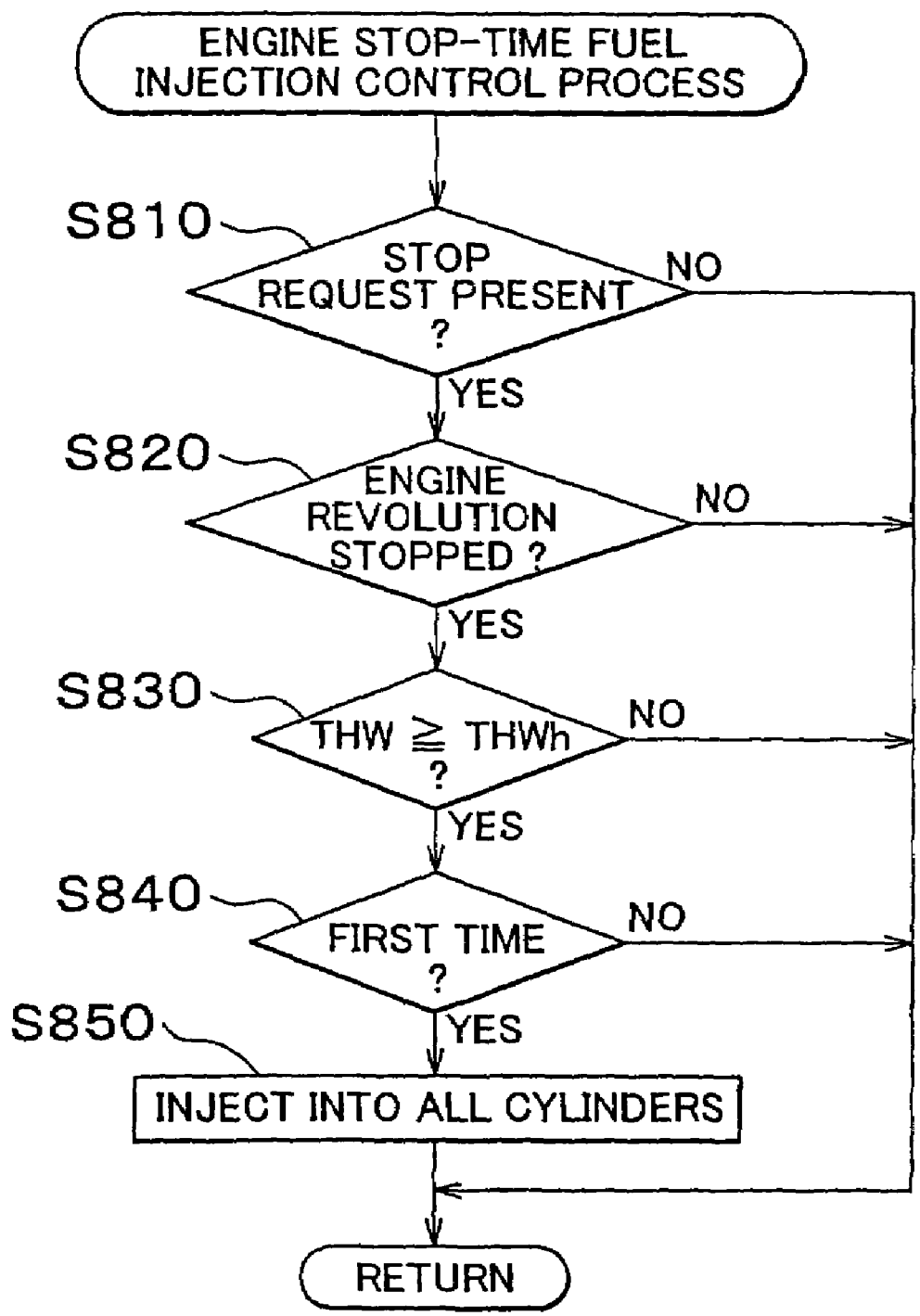
FIG. 18 is a flowchart illustrating an engine stop-time fuel injection control process executed by an engine ECU in Embodiment 11.

This embodiment differs from Embodiment 1 in that the engine ECU 50 does not execute the process of FIG. 2, but repeatedly executes an engine stop-time fuel injection control process illustrated in FIG. 18 in short-time cycles.

When the engine stop-time fuel injection control process (FIG. 18) starts, it is first determined whether there is a stop request based on automatic stop or manual stop (S810). If a stop request is not present ("NO" at S810), the process temporarily ends without any further processing.

If a stop request is present ("YES" at S810), it is subsequently determined whether the engine 2 has stopped turning (S820). That is, it is determined that engine rotation has stopped, if, for example, 500 msec elapses following discontinuation of engine rotation speed NE-corresponding pulse signals output by the engine rotation speed sensor. If engine rotation has not stopped ("NO" at S820), the process temporarily ends without any further processing.

If engine rotation stops ("YES" at S820), it is subsequently determined whether the engine cooling water temperature THW is higher than or equal to a high-temperature criterion THWh (S830). The high-temperature criterion THWh is a criterion for indicating that if the engine stops without any change from the present state, the danger of pre-ignition will increase due to temperature rise in combustion chambers. If THW<THWh ("NO" at S830), the process temporarily ends without any further processing.

If THW≧THWh ("YES" at S830), it is then determined (S840) whether the present execution is the first execution after the stop of engine rotation. If the present execution is the first execution ("YES" at S840), fuel injection is performed simultaneously with respect to all the cylinders (S850), and the process temporarily ends. The purpose of this fuel injection is to cool the high-temperature combustion chambers in advance by heat absorption involved in evaporation of fuel. The amount of fuel injected may be a fixed amount, or may be suitably set in accordance with the combustion chamber temperature THC. In this case, too, the fuel injection is accomplished by residual pressure in the delivery pipe 38.

In the subsequent cycle of control, the present execution is no longer the first execution ("NO" at S840), and the process temporarily ends without any further processing. After that, the engine stop-time fuel injection control process (FIG. 18) is not substantially performed until a stop request is made again following a startup request.

In the foregoing construction, step S830 corresponds to a process performed by the high-temperature determining portion, and steps S810, S820, S840 and S850 correspond to a process performed by a during-stop fuel injection setting portion.

According to Embodiment 11 described above, the following advantages are achieved.

(a) If the engine 2 is in a high-temperature state during a stop of engine rotation, an engine startup during the high-temperature state will lead to high possibility of pre-ignition. Therefore, if during a stop of engine rotation, the engine cooling water temperature THW is high, the combustion chambers are cooled in advance by injecting fuel into the combustion chamber immediately after the stop of rotation of the engine. This cooling process reduces the likelihood of pre-ignition occurring at the time of startup. Since the combustion chambers are cooled by fuel injection immediately after a stop of the engine if temperature is high at the time of stop, the engine can be started in a cooled state regardless of the timing of output of a startup request.

(b) An advantage the same as the advantage (b) of Embodiment 2 is achieved.

Embodiment 12

Figure 19:
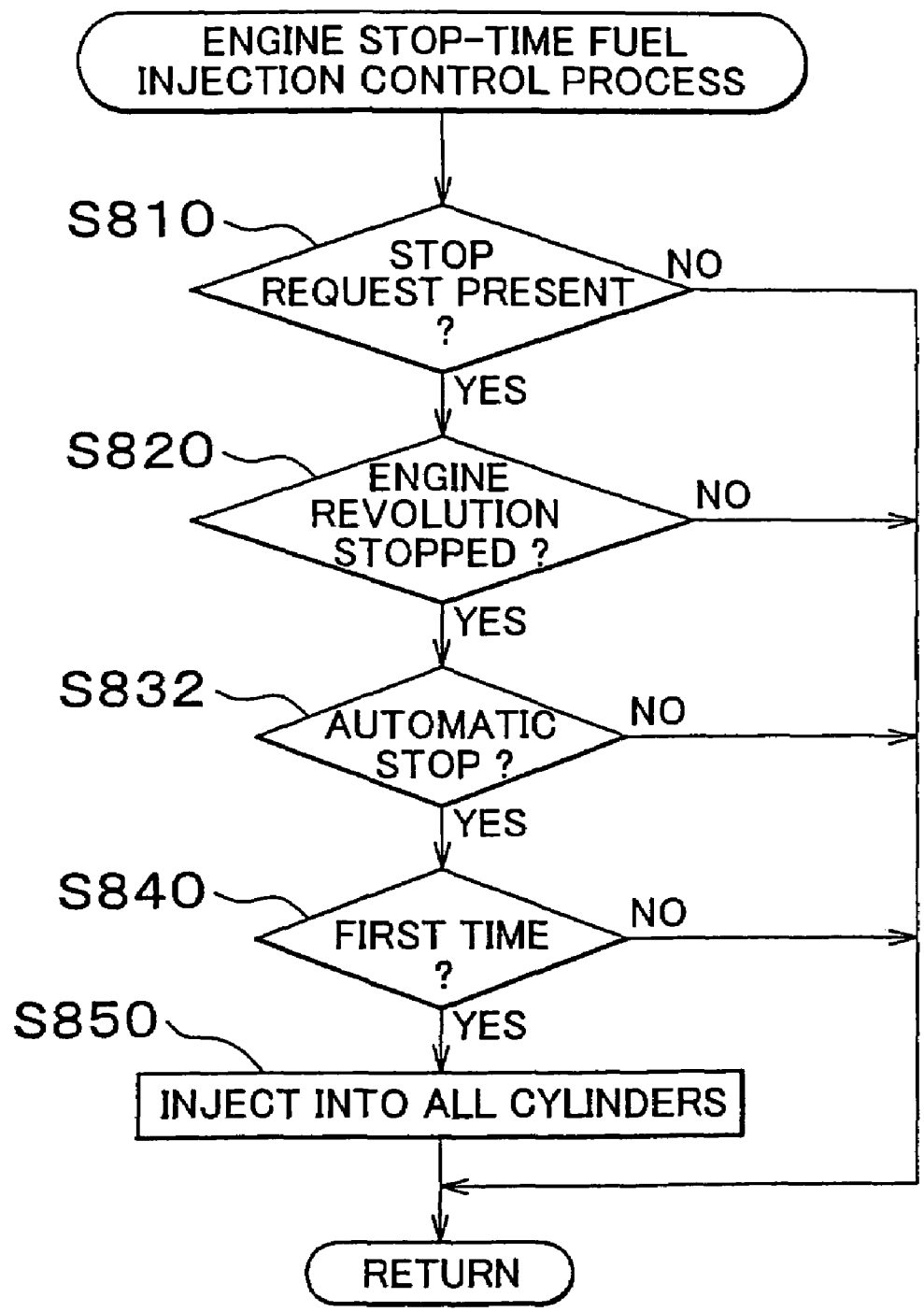
FIG. 19 is a flowchart illustrating an engine stop-time fuel injection control process executed by an engine ECU in Embodiment 12.

This embodiment differs from Embodiment 11 in that the engine ECU 50 repeatedly executes an engine stop-time fuel injection control process illustrated in FIG. 19 in short-time cycles, instead of the process illustrated in FIG. 18. The process of FIG. 19 differs from the process of FIG. 18 only in that step S832 is executed in place of step S830.

That is, if in response to a stop request ("YES" at S810), engine rotation stops ("YES" at S820), it is subsequently determined whether the engine stop is an automatic stop (S832). If the stop is a manual stop ("NO" at S832), the process temporarily ends without any further processing.

Conversely, if the engine stop is an automatic start ("YES" at S832), the process proceeds to step S840. Step 840 and step S850 are described above in conjunction with Embodiment 11.

In the foregoing construction, the engine stop-time fuel injection control process (FIG. 19) corresponds to a process performed by a stop-time fuel injection setting portion.

According to Embodiment 12 described above, the following advantages are achieved.

(a) Since a setting is made such that fuel is injected into the combustion chambers immediately after the engine is stopped by automatic stop, it is possible to prevent a high-temperature state of the engine 2 and prevent execution of automatic start during a high-temperature state. Therefore, the likelihood of pre-ignition is reduced.

(b) An advantage the same as the advantage (b) of Embodiment 2 is achieved.

Other Embodiment

Although in Embodiments 1 and 2, fuel injection is permitted after rotation of a crank angle corresponding to the reference delay value Cw following the start of cranking, it is also possible to set a time-based delay period and permit fuel injection after the elapse of the delay period following the start of cranking.

Although in Embodiment 3, the reducing correction value dQ for the high-temperature startup is set at greater values with increases in temperature, the reducing correction value dQ for the high-temperature startup may also be set at a fixed value.

Although in Embodiments 1, 3, 4, 5, 7 and 9, the combustion chamber temperature THC is estimated, the combustion chamber temperature THC may instead be directly detected by an in-combustion chamber temperature sensor provided in a cylinder head or a cylinder block. Furthermore, instead of the combustion chamber temperature THC, the engine cooling water temperature THW acquired from the water temperature sensor 51 may be used. In this case, an advantage the same as the advantage (b) of Embodiment 2 is achieved.

Although in Embodiment 8, only whether to drive the water pump is controlled based on the content of setting of the water pump drive flag XWP, it is also possible to adjust the rotation speed of the water pump driven by the MG 26 in accordance with the value of engine cooling water temperature THW so that the rotation speed increases with increases in the engine cooling water temperature THW.

Although in Embodiments 8 and 11, the engine cooling water temperature THW is used, it is also possible to use the engine cooling water temperature THW acquired by estimation or direct detection. Furthermore, during operation of the engine 2, it is also possible to use the exhaust temperature detected by an exhaust temperature sensor provided in the exhaust passage, instead of the engine cooling water temperature THW or the engine cooling water temperature THW.

In Embodiments 9 to 12, the fuel injection is accomplished by residual pressure in the delivery pipe 38. However, if the high-pressure pump is an electric pump, or is provided as an accessory 22, the high-pressure pump can be driven by directly supplying electric power thereto or using the MG 26, so that the aforementioned fuel injection can be accomplished without consumption of residual pressure in the delivery pipe 38. Therefore, engine startup characteristic can be improved.

The foregoing embodiments may be combined in any suitable manner.

Means for achieving the aforementioned objects, and operation and advantages of the means will be stated below.

An internal combustion engine startup-time control apparatus is a startup-time control apparatus of an internal combustion engine in which fuel is injected into a combustion chamber, and is characterized by including: a high-temperature startup determining portion that determines whether the internal combustion engine is in a high-temperature state at a time of startup of the internal combustion engine; and a fuel injection start timing setting portion that sets an injection timing of an injection valve such that fuel injection starts after a delay period elapses following a start of cranking if the high-temperature startup determining portion determines that the internal combustion engine is in the high-temperature state at the time of startup.

If the high-temperature determining portion determines that the startup is a high-temperature startup, the fuel injection start timing setting portion does not immediately inject fuel upon the start of cranking, but sets an injection timing of an injection valve such that fuel injection is started after the delay period elapses following the start of cranking. Therefore, during the delay period, cranking causes circulation of cooling water, and replacement of intake air in the combustion chambers, thereby cooling the interior of the combustion chambers. After that, fuel injection is started. Since the combustion chambers have been cooled, direct fuel injection into the combustion chambers will not lead to ignition of air-fuel mixture prior to spark ignition. Therefore, pre-ignition can be prevented in both the case of automatic startup and the case of manual startup.

An internal combustion engine startup-time control apparatus is a startup-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed. The control apparatus is characterized by including a fuel injection start timing setting portion that sets an injection timing of an injection valve such that fuel injection starts after a delay period elapses following a start of cranking if the combustion operation is automatically restarted.

In an internal combustion engine in which automatic stop-automatic start is performed, in particular, fuel injection may be started after the elapse of the delay period following the start of cranking regardless of a high-temperature condition, when combustion operation is automatically restarted, that is, at the time of automatic startup. This is because in the case of automatic startup, there is high incidence of engine startup occurring during a high-temperature state of the combustion chamber. Therefore, pre-ignition can be prevented.

In either one of the constructions described above, the delay period may be a length of time that is needed for an engine cooling water present outside the engine immediately prior to the start of cranking to reach a surrounding of the combustion chamber and reduce a temperature in the combustion chamber.

By setting the delay period as a length of time that is needed before an engine cooling water present outside the engine immediately prior to the start of cranking reaches a surrounding of the combustion chamber and reduces a temperature in the combustion chamber, pre-ignition can be more reliably prevented.

An internal combustion engine startup-time control apparatus is a startup-time control apparatus of an internal combustion engine in which fuel is injected into a combustion chamber, and is characterized by including: a high-temperature startup determining portion that determines whether the internal combustion engine is in a high-temperature state at a time of startup of the internal combustion engine; and a startup-time fuel injection amount setting portion that sets a smaller amount of fuel injection at a time of startup if the high-temperature startup determining portion determines that the internal combustion engine is in the high-temperature state at the time of startup than if the internal combustion engine is not in the high-temperature state at the time of startup.

Thus, in the case of high-temperature startup, reducing the amount of fuel injection makes pre-ignition unlikely and, if pre-ignition occurs, reduces damage to the internal combustion engine.

An internal combustion engine startup-time control apparatus is a startup-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed. The control apparatus is characterized by including a startup-time fuel injection amount setting portion that, if the combustion operation is automatically restarted, sets an amount of fuel injection at a time of startup as an amount that is smaller than the amount of fuel injection set at a time of startup caused by a startup operation performed by an operator.

In an internal combustion engine in which automatic stop-automatic startup is performed, setting a smaller amount of fuel injection at the time of automatic startup than at the time of manual startup regardless of a high-temperature condition makes pre-ignition unlikely and, if pre-ignition occurs, reduces damage to the internal combustion engine.

An internal combustion engine startup-time control apparatus is a startup-time control apparatus in which fuel injection into a combustion chamber and fuel injection into an intake passage are possible, and is characterized by including: a high-temperature startup determining portion that determines whether the internal combustion engine is in a high-temperature state at a time of startup of the internal combustion engine; and a startup-time fuel injection selecting portion which accomplishes the fuel injection at the time of startup by performing the fuel injection into the combustion chamber or the fuel injection into both the combustion chamber and the intake passage if the high-temperature startup determining portion determines that the internal combustion engine is not in the high-temperature state at the time of startup, and which accomplishes the fuel injection at the time of startup by performing the fuel injection into the intake passage if the high-temperature startup determining portion determines that the internal combustion engine is in the high-temperature state at the time of startup.

Thus, in the case of high-temperature startup, fuel injection at the time of startup is accomplished by fuel injection into the intake passage. Since fuel is not directly injected into the combustion chambers, pre-ignition is unlikely to occur. If the startup is not a high-temperature startup, fuel injection at the time of startup can be accomplished by fuel injection into the combustion chamber or fuel injection into both the combustion chamber and the intake passage. Therefore, fuel can be supplied into the combustion chamber early, and combustion can be promptly started. Hence, engine startup characteristic can be improved. The expression "fuel injection into the combustion chamber and fuel injection into both the combustion chamber and the intake passage" includes a case where only the fuel injection into the combustion chamber is performed, a case where only the fuel injection into both the combustion chamber and the intake passage is performed, and a case where the fuel injection into only the combustion chamber or the fuel injection into both the combustion chamber and the intake passage is selectively performed in accordance with need. This applies in other constructions of the invention.

An internal combustion engine startup-time control apparatus is a startup-time control apparatus of an internal combustion engine in which fuel injection into a combustion chamber and fuel injection into an intake passage are possible, and in which an automatic stop-automatic startup control of automatically stopping a combustion operation if an automatic stop condition is met, and of automatically restarting the combustion operation if an automatic start condition is met, is performed. The control apparatus is characterized by including a startup-time fuel injection selecting portion which accomplishes the fuel injection at the time of startup by performing the fuel injection into the combustion chamber or the fuel injection into both the combustion chamber and the intake passage if the startup is other than a case where the combustion operation is automatically started, and which accomplishes the fuel injection at the time of startup by performing the fuel injection into the intake passage if the combustion operation is automatically restarted.

In an internal combustion engine in which automatic stop-automatic start is performed, in particular, pre-ignition can be made unlikely in the case of automatic start by accomplishing fuel injection at the time of startup through fuel injection into the intake passage, regardless of a high-temperature condition. At the time of startup other than automatic startup, fuel injection at the time of startup is accomplished by fuel injection into the combustion chamber or fuel injection into both the combustion chamber and the intake passage, so that fuel can be supplied into the combustion chamber early and combustion can be promptly started. Therefore, engine startup characteristic can be improved.

An internal combustion engine stop-time control apparatus is a stop-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed. The control apparatus is characterized by including: a high-temperature stop determining portion that determines whether the internal combustion engine is in a high-temperature state when the automatic stop condition is met; and an automatic stop execution control portion which executes automatic stop of the combustion operation if the high-temperature stop determining portion determines that the internal combustion engine is not in the high-temperature state when the automatic stop condition is met, and which prohibits the automatic stop of the combustion operation if the high-temperature stop determining portion determines that the internal combustion engine is in the high-temperature state when the automatic stop condition is met.

In the case of an internal combustion engine in which automatic stop-automatic startup is performed, if the internal combustion engine is in the high-temperature state when the automatic stop condition is met, automatic stop of the combustion operation, that is, generally-termed automatic stop, is prohibited. If the internal combustion engine is already in the high-temperature state when the engine is to be stopped, execution of automatic stop without any change from the present state will lead to high possibility of further increased temperature occurring in the combustion chamber at the time of subsequent automatic start. Therefore, by prohibiting the automatic stop, automatic start is avoided, so that pre-ignition at the time of automatic start is prevented.

An internal combustion engine stop-time control apparatus is a stop-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed. The control apparatus is characterized by including a pre-startup cooling portion that drives a cooling device of the internal combustion engine during an automatic stop of the combustion operation.

Since the cooling device of the internal combustion engine is driven during an automatic stop, the interior of the combustion chamber is cooled, and therefore temperature drops. Therefore, at the time of automatic start, fuel is injected into the already cooled combustion chamber, so that pre-ignition can be prevented.

In the above-described construction of the internal combustion engine stop-time control apparatus, the pre-startup cooling portion may drive the cooling device of the internal combustion engine by electric energy.

If the cooling device of the internal combustion engine is driven by using electric energy from, for example, a battery or the like, the interior of the combustion chamber can be cooled even prior to the cranking of the engine, so that pre-ignition at the time of automatic startup can be prevented.

The internal combustion engine stop-time control apparatus may further include a high-temperature determining portion that determines whether the internal combustion engine is in a high-temperature state, wherein the pre-startup cooling portion drives the cooling device of the internal combustion engine if the high-temperature determining portion determines that the internal combustion engine is in the high-temperature state during an automatically-caused stop of the combustion operation.

The case where the cooling device is driven may be limited to the case where the internal combustion engine is in the high-temperature state. This reduces consumption of energy for driving the cooling device.

An internal combustion engine startup-time control apparatus is a startup-time control apparatus of an internal combustion engine in which fuel is injected into a combustion chamber. The control apparatus is characterized by including: a high-temperature startup determining portion that determines whether the internal combustion engine is in a high-temperature state at a time of startup; and a pre-fuel injection setting portion that sets an injection timing of an injection valve such that fuel is injected into the combustion chamber prior to cranking if the high-temperature startup determining portion determines that the internal combustion engine is in the high-temperature state at the time of startup.

Thus, in the case of high-temperature startup, fuel is injected into the combustion chamber prior to the cranking at the time of startup, so that the interior of the combustion chamber can be cooled by heat absorption involved in evaporation of fuel. As the cranking is yet to be performed, air-fuel mixture formed by injecting fuel into the combustion chamber is not immediately compressed, but is allowed to sufficiently evaporate and absorb heat. Therefore, this operation will make pre-ignition more unlikely than fuel injection at the time of cranking.

An internal combustion engine startup-time control apparatus is a startup-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed. The control apparatus is characterized by including a pre-fuel injection setting portion that sets an injection timing of an injection valve such that fuel is injected into the combustion chamber prior to cranking at the time of automatic startup.

In an internal combustion engine startup-time control apparatus in which automatic stop-automatic startup is performed, in particular, fuel is injected into the combustion chamber at the time of automatic start prior to cranking, regardless of a high-temperature state. Therefore, heat absorption involved in evaporation cools the interior of the combustion chamber, so that pre-ignition becomes more unlikely.

An internal combustion engine stop-time control apparatus is a stop-time control apparatus of an internal combustion engine in which fuel is injected into a combustion chamber, and is characterized by including: a high-temperature determining portion that determines whether the internal combustion engine is in a high-temperature state; and a during-stop fuel injection setting portion that sets an injection timing of an injection valve such that fuel is injected into the combustion chamber if the high-temperature determining portion determines that the internal combustion engine is in the high-temperature state during a stop of rotation of the internal combustion engine.

If the internal combustion engine is in the high-temperature state during a stop of engine rotation and the startup of the engine is initiated during the high-temperature state, there is high possibility of pre-ignition. Therefore, if the internal combustion engine is in the high-temperature state during a stop of engine rotation, the interior of the combustion chamber is cooled in advance by injecting fuel into the combustion chamber. This operation reduces the likelihood of pre-ignition occurring at the time of startup.

In the above-described construction of the internal combustion engine stop-time control apparatus, the during-stop fuel injection setting portion may make a setting such that fuel is injected into the combustion chamber if the high-temperature determining portion determines that the internal combustion engine is in the high-temperature state immediately after the internal combustion engine stops rotating in association with a stop of a combustion operation.

After the internal combustion engine stops turning, the temperature in the combustion chamber immediately starts to rise upon a stop of the cooling device of the internal combustion engine. Therefore, if the engine has high temperature when the engine stops rotating, the temperature of the engine is expected to further rise. Furthermore, it is not known when startup is performed. Therefore, fuel injection timing is set at timing immediately following a stop of rotation of the internal combustion engine, so that pre-ignition is more effectively prevented.

An internal combustion engine startup-time control apparatus is a stop-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed. The control apparatus is characterized by including a stop-time fuel injection setting portion that sets an injection timing of an injection valve such that fuel is injected into the combustion chamber immediately after rotation of the internal combustion engine is stopped due to the automatically-caused stop of combustion operation.

Due to setting such that fuel is injected into the combustion chamber immediately after rotation of the internal combustion engine is stopped by the automatic stop, it is possible to prevent the internal combustion engine from having further increased temperature. Therefore, automatic startup of the engine during the high-temperature state can be prevented. Therefore, pre-ignition can be made more unlikely.

The method of the invention may be applied as a program that is caused to function as any one of the control apparatuses described above, or a record medium that stores the program in such a fashion that the program can be read by a computer. The record medium may be of various forms, including a CD-ROM, a floppy disk, a DVD-ROM, etc. The record medium may also be a computer-readable program transmission medium that is caused to function as a control apparatus.

While the invention has been described with reference to what are presently considered to be preferred embodiments thereof, it is to be understood that the invention is not limited to the disclosed embodiments or constructions. To the contrary, the invention can be carried out in forms without departing from the spirit of the invention.

What is claimed is:

1. A stop-time control apparatus of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed, the control apparatus comprising:

an automatic stop determining portion that determines whether the combustion operation has been automatically stopped; and a pre-startup cooling portion that drives a cooling device of the internal combustion engine to cool the internal combustion engine during a stop of the combustion operation if the automatic stop determining portion determines that the combustion operation has been automatically stopped; and a high-temperature determining portion that determines whether the internal combustion engine is in a high-temperature state such that a pre-ignition would result if the automatic startup control is executed without any change from a present state, wherein the pre-startup cooling portion drives the cooling device of the internal combustion engine if the high-temperature determining portion determines that the internal combustion engine is in the high-temperature state during an automatically-caused stop of the combustion operation.

2. The control apparatus according to claim 1, wherein the pre-startup cooling portion drives the cooling device of the internal combustion engine by electric energy.

3. A stop-time control method of an internal combustion engine in which fuel is injected into a combustion chamber, and in which an automatic stop-automatic startup control of automatically stopping a combustion operation if an automatic stop condition is met, and of automatically restarting the combustion operation if an automatic start condition is met, is performed, the control method comprising:

determining whether the internal combustion engine is in a high-temperature state such that a pre-ignition would result if the automatic startup control is executed without any change from a present state, driving the cooling device of the internal combustion engine if it is determined that the internal combustion engine is in the high-temperature state during an automatically-caused stop of the combustion operation.

4. The control method according to claim 3, wherein the pre-startup cooling portion drives the cooling device of the internal combustion engine by electric energy.

5. A computer-readable storage medium storing a computer program executable on a data processing device for controlling a temperature of internal combustion engine the program comprising:

instructions for determining whether the internal combustion engine is in a high-temperature state such that a pre-ignition would result if an automatic startup control is executed without any change from a present state, instructions for driving the cooling device of the internal combustion engine if it is determined that the internal combustion engine is in the high-temperature state during an automatically-caused stop of the combustion operation.

* * * * *